US012746463B2

(12) United States Patent
Okamura et al.

(10) Patent No.: US 12,746,463 B2
(45) Date of Patent: Sep. 29, 2026

(54) INPUT DEVICE

(71) Applicant: NINTENDO CO., LTD., Kyoto (JP)

(72) Inventors: Takanori Okamura, Kyoto (JP); Yuki Taniguchi, Kyoto (JP); Hiroki Ikuta, Kyoto (JP); Keisuke Seko, Kyoto (JP); Masaya Takei, Kyoto (JP)

(73) Assignee: NINTENDO CO., LTD, Kyoto (JP)

( * ) Notice: Subject to any disclaimer, the term of this patent is extended or adjusted under 35 U.S.C. 154(b) by 85 days.

(21) Appl. No.: 18/882,122

(22) Filed: Sep. 11, 2024

(65) Prior Publication Data

US 2025/0001287 A1 Jan. 2, 2025

Related U.S. Application Data

(63) Continuation of application No. 17/938,687, filed on Oct. 7, 2022, now Pat. No. 12,357,907, which is a (Continued)

(30) Foreign Application Priority Data

Oct. 17, 2019 (JP) ................................ 2019-189963

(51) Int. Cl.
*A63F 13/24* (2014.01)
*A63F 13/92* (2014.01)

(52) U.S. Cl.
CPC .............. *A63F 13/24* (2014.09); *A63F 13/92* (2014.09); *A63F 2300/1043* (2013.01)

(58) Field of Classification Search
None
See application file for complete search history.

(56) References Cited

U.S. PATENT DOCUMENTS 5,432,530 A 7/1995 Arita
5,675,309 A 10/1997 Devolpi
(Continued)

FOREIGN PATENT DOCUMENTS

EP 3 473 309 4/2019
JP H09-244802 9/1997
(Continued)

OTHER PUBLICATIONS

English Translation of JP2000123690A, 2023, https://translation.epo.org/emtp/translate/?ACTION=description-retrieval&COUNTRY=JP&ENGINE=google&FORMAT=docdb&KIND=A&LOCALE=en_EP&NUMBER=2000123690&OPS=ops/epo.org/3.2&SRCLANG=ja&TRGLANG=en , pp. 1-12 see attached (Year: 2023).
(Continued)

*Primary Examiner* — Tramar Harper
(74) *Attorney, Agent, or Firm* — NIXON & VANDERHYE, P.C.

(57) ABSTRACT

An example of a controller includes a housing including an opening, and an operation member, a part of which is exposed through the opening. The operation member includes a key top exposed through the opening and operated by a user, a shaft portion extending downward from the key top, and a protruding portion protruding from the shaft portion. Further, in the housing, a pedestal with which the protruding portion of the operation member comes into contact when the operation member is tilted is provided. The tilt of the operation member is limited by the protruding portion coming into contact with the pedestal.

19 Claims, 15 Drawing Sheets

Related U.S. Application Data continuation of application No. 17/002,273, filed on Aug. 25, 2020, now Pat. No. 11,497,987.

(56) References Cited

U.S. PATENT DOCUMENTS

| | | | |
|---|---|---|---|
| 5,724,068 | A | 3/1998 | Sanchez |
| 5,804,781 | A | 9/1998 | Okabe |
| 6,118,086 | A | 9/2000 | Isikawa |
| 6,153,876 | A | 11/2000 | Fujita |
| 6,189,401 | B1 | 2/2001 | Atwell |
| 6,231,444 | B1 | 5/2001 | Goto |
| 6,352,477 | B1 | 3/2002 | Soma |
| 6,589,118 | B1 | 7/2003 | Soma et al. |
| 11,497,987 | B2 | 11/2022 | Okamura et al. |
| 2002/0190945 | A1 | 12/2002 | Arita |
| 2003/0057062 | A1 * | 3/2003 | Inoue ................... H01H 25/041 200/6 A |
| 2006/0061549 | A1 | 3/2006 | Chen |
| 2008/0004114 | A1 * | 1/2008 | McVicar ............... A63F 13/285 463/37 |
| 2012/0142418 | A1 | 6/2012 | Muramatsu |
| 2012/0188156 | A1 | 7/2012 | Takahashi |
| 2012/0274563 | A1 | 11/2012 | Olsson |
| 2013/0098191 | A1 | 4/2013 | Manullang |
| 2014/0251070 | A1 | 9/2014 | Kornelson |
| 2016/0346680 | A1 | 12/2016 | Tsai |
| 2016/0346681 | A1 | 12/2016 | Tsai |
| 2017/0304717 | A1 | 10/2017 | Huang |
| 2017/0354895 | A1 | 12/2017 | Dornbusch |
| 2017/0368451 | A1 | 12/2017 | Tiffany et al. |
| 2017/0368452 | A1 | 12/2017 | Tiffany et al. |
| 2018/0200617 | A1 | 7/2018 | Tiffany et al. |
| 2018/0356854 | A1 | 12/2018 | Spiteri |
| 2021/0113919 | A1 | 4/2021 | Okamura et al. |
| 2023/0056908 | A1 | 2/2023 | Okamura et al. |
| 2023/0293983 | A1 | 9/2023 | Koriyama et al. |

FOREIGN PATENT DOCUMENTS

| | | | |
|---|---|---|---|
| JP | 2000-123690 | | 4/2000 |
| JP | 2000123690 | A * | 4/2000 |
| JP | 2000-195381 | A | 7/2000 |
| JP | 2002-117750 | A | 4/2002 |
| JP | 2005-165608 | | 6/2005 |
| JP | 2008-200140 | | 9/2008 |
| JP | 2014-061225 | | 4/2014 |
| JP | 2016-007345 | | 1/2016 |
| JP | 6694196 | | 5/2020 |
| JP | 2020-523673 | | 8/2020 |
| WO | 2018/224801 | | 12/2018 |
| WO | 2018/229466 | | 12/2018 |

OTHER PUBLICATIONS

Extended European Search Report issued on Dec. 9, 2020 in corresponding European Application No. 20189675.0, 9 pages.

* cited by examiner

INPUT DEVICE

CROSS REFERENCE TO RELATED APPLICATION

This application is a continuation of U.S. application Ser. No. 17/938,687, filed Oct. 7, 2022, which is a continuation of U.S. application Ser. No. 17/002,273, filed Aug. 25, 2020, now U.S. Pat. No. 11,497,987, which claims priority to Japanese Patent Application No. 2019-189963, filed on Oct. 17, 2019, each of which is incorporated herein by reference.

FIELD

An exemplary embodiment relates to an input device, a game controller, and an information processing apparatus.

BACKGROUND AND SUMMARY

There is a game controller including a multi-directional input section. For example, there is a controller including an analog stick as a multi-directional input section. The analog stick is exposed through an opening provided in a housing of the controller and is operated by a user.

In the controller, when the multi-directional input section is operated, a shaft portion of the multi-directional input section comes into contact with the housing, thereby limiting the motion of the multi-directional input section.

Therefore, it is an object of an exemplary embodiment to provide a new technique for limiting the motion of an operation member.

To achieve the above object, the exemplary embodiment employs the following configurations.

An aspect of the exemplary embodiment is an input device including a housing including an opening, and an operation member, a part of which is exposed through the opening and which is movable in a peripheral direction of the opening. The operation member includes: a key top exposed through the opening and operated by a user; a shaft portion extending downward from the key top; and a protruding portion protruding from the shaft portion. The input device further includes a contact target portion. The contact target portion is within the housing, and the protruding portion comes into contact with the contact target portion when the operation member moves in the peripheral direction of the opening.

Based on the above, when an operation member moves in a peripheral direction of an opening, a protruding portion of the operation member comes into contact with a contact target portion within a housing, thereby limiting the motion of the operation member.

Further, in another aspect, the protruding portion may protrude in a direction away from a center of the shaft portion and downward.

Further, in another aspect, when the operation member moves in the peripheral direction of the opening, an extremity of the protruding portion may come into contact with the contact target portion.

Further, in another aspect, the extremity of the protruding portion may have a round shape.

Further, in another aspect, the contact target portion may be formed of a material having a lower coefficient of friction than at least a peripheral portion of the opening in the housing.

Further, in another aspect, when the operation member moves in the peripheral direction of the opening, the protruding portion may come into contact with the contact target portion without the shaft portion coming into contact with the housing.

Further, in another aspect, when the operation member moves in the peripheral direction of the opening, the protruding portion may come into contact with the contact target portion before the shaft portion comes into contact with the housing.

Further, in another aspect, the contact target portion may include a contact surface with which the protruding portion comes into contact, and a wall portion extending upward from the contact surface.

Further, in another aspect, the wall portion may be in an end portion, on a center side of the shaft portion, of the contact surface.

Further, in another aspect, when the operation member moves in any peripheral direction of the opening, the protruding portion may come into contact with the contact target portion.

Further, in another aspect, a portion of the protruding portion that comes into contact with the contact target portion may have a circular shape, and a portion of the contact target portion that comes into contact with the protruding portion may have a circular shape.

Further, in another aspect, the input device may further include a cushioning material in a portion where the protruding portion and the contact target portion come into contact with each other.

Further, in another aspect, a difference between a length of a portion of the protruding portion that comes into contact with the contact target portion and a length of a portion of the contact target portion that comes into contact with the protruding portion may be smaller than a difference between a perimeter of the shaft portion and a perimeter of the opening.

Further, in another aspect, a game controller including the operation member and the contact target portion may be provided. Further, in another aspect, an information processing apparatus including the input device may be provided.

According to the exemplary embodiment, it is possible to limit the motion of an operation member using a non-conventional technique.

These and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

With reference to the drawings, a game controller 1 (an example of an input device) according to an exemplary embodiment is described below. The game controller 1 according to the exemplary embodiment is connected to a game apparatus (not shown) in a wireless or wired manner and used to perform an operation in a game performed in the game apparatus. It should be noted that the game apparatus to which the game controller 1 is connected may be a mobile game apparatus or may be a stationary game apparatus. Further, the game controller 1 may be connected not only to a game apparatus but also to an information processing apparatus such as a smartphone, a tablet terminal, or a personal computer and used to perform an operation in a game performed using the information processing apparatus.

Figure 1:
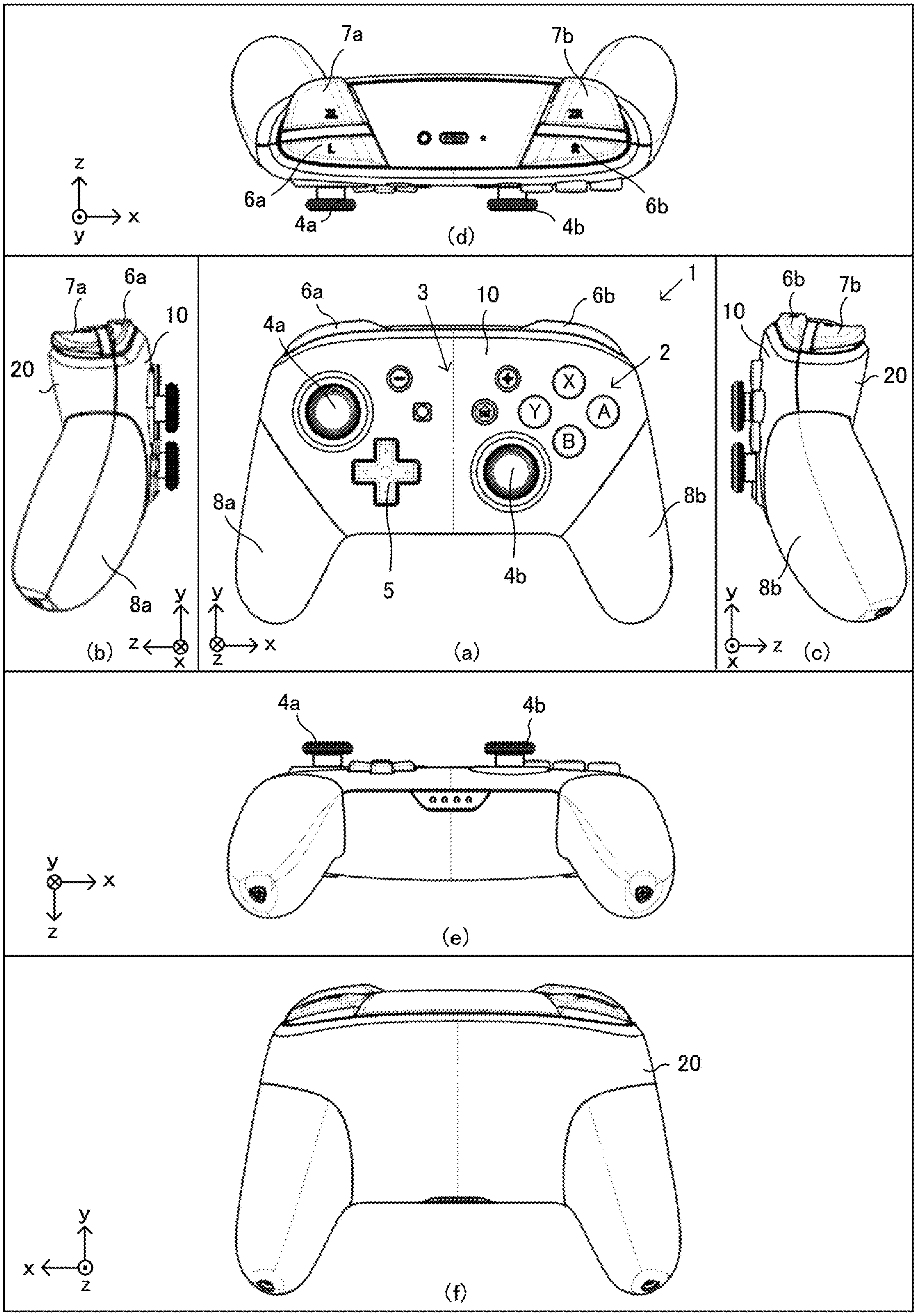
FIG. 1 is example non-limiting external views of a game controller 1.

FIG. 1 is examples of external views of the game controller 1. (a) of FIG. 1 is a front view of the game controller 1. (b) of FIG. 1 is a left side view of the game controller 1. (c) of FIG. 1 is a right side view of the game controller 1. (d) of FIG. 1 is a top view of the game controller 1. (e) of FIG. 1 is a bottom view of the game controller 1. (f) of FIG. 1 is a rear view of the game controller 1. An xyz coordinate system in FIG. 1 is a coordinate system based on the game controller 1. The xyz coordinate system defines a direction perpendicular to a front surface of the game controller 1 (e.g., the direction in which buttons 2 are pressed) as a z-axis direction, defines a left-right direction of the game controller 1 (e.g., the direction in which an A-button 2 and a Y-button 2 are connected together) as an x-axis direction, and defines an up-down direction of the game controller 1 (e.g., the direction in which a B-button 2 and an X-button 2 are connected together) as a y-axis direction.

As shown in FIG. 1, the game controller 1 includes a first housing 10 on the front surface side of the game controller 1 and a second housing 20 on a back surface side of the game controller 1. The first housing 10 and the second housing 20 are connected together, thereby forming a housing of the game controller 1. The first housing 10 and the second housing 20 may be formed of, for example, an ABS resin, a polycarbonate ABS resin, an acrylic ABS resin, or the like, or may be formed of a polymer alloy including at least two of these three materials. Further, the game controller 1 includes a left grip portion 8*a* and a right grip portion 8*b*.

Further, as shown in FIG. 1, in a right region of the front surface of the game controller 1, four buttons (an A-button, a B-button, an X-button, and a Y-button) 2 are provided. Further, to the left side of the four buttons 2, four buttons (a "+" button, a "−" button, a home button, and a capture button) 3 are provided. Further, in the right region of the front surface of the game controller 1 and obliquely below and to the left of the Y-button 2, a right analog stick 4*b* is provided.

Further, in a left region of the front surface of the game controller 1 and to the left side of the "−" button 3, a left analog stick 4*a* is placed. Further, in the left region of the front surface of the game controller 1 and obliquely below and to the right of the left analog stick 4*a*, a directional pad 5 is placed.

Further, as shown in (d) of FIG. 1, on an upper surface of the game controller 1, an L-button 6*a*, a ZL-button 7*a*, an R-button 6*b*, and a ZR-button 7*b* are provided. Specifically, the L-button 6*a* is provided in a left end portion on the upper surface of the game controller 1. The ZL-button 7*a* is provided on the game controller 1 back surface side (further in a positive z-axis direction) of the L-button 6*a*. Further, the R-button 6*b* is provided in a right end portion on the upper surface of the game controller 1. The ZR-button 7*b* is provided on the game controller 1 back surface side (further in the positive z-axis direction) of the R-button 6*b*.

The four buttons 2 are buttons that can be pressed in a depth direction (the positive z-axis direction) in (a) of FIG. 1, and are buttons used for a game operation. Further, the four buttons 3 are buttons that can be pressed in the positive z-axis direction. Further, the directional pad 5 is a device for indicating up, down, left, and right directions.

Further, the left analog stick 4*a* and the right analog stick 4*b* are devices for indicating directions and are each configured such that a key top of the analog stick to be operated by the finger of a user can be tilted in any directions (at any angles in up, down, left, right, and oblique directions). The left analog stick 4*a* and the right analog stick 4*b* may be configured to be pressed in the positive z-axis direction. It should be noted that hereinafter, the left analog stick 4*a* and the right analog stick 4*b* will occasionally be collectively referred to as an "analog stick 4". The analog stick 4 outputs a signal including information regarding the direction in which the analog stick 4 is tilted, and information regarding the angle of the tilt. The game apparatus can execute game processing based on this signal. The details of the analog stick 4 will be described later.

Figure 2:
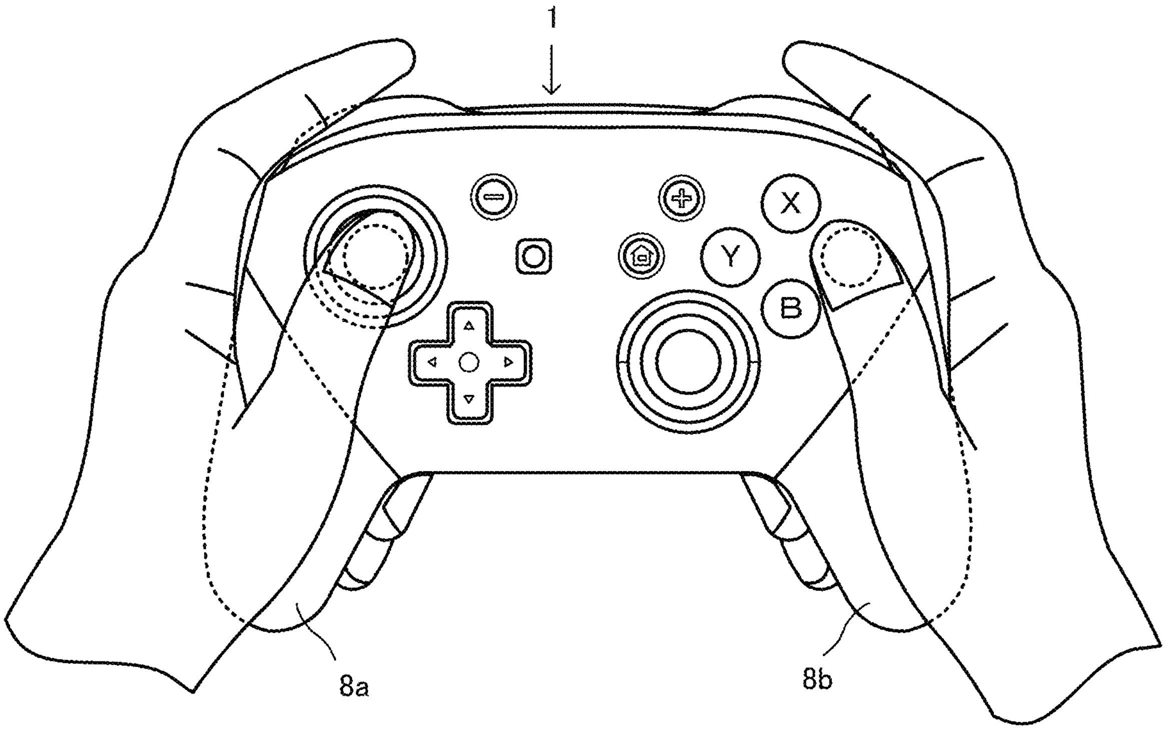
FIG. 2 is an example non-limiting diagram showing the state where a user holds the game controller 1 with both hands.

FIG. 2 is a diagram showing the state where the user holds the game controller 1 with both hands. As shown in FIG. 2, when the user holds the grip portion 8*a* with their left hand and holds the grip portion 8*b* with their right hand, the user can operate the left analog stick 4*a* and the directional pad 5 with the thumb of the left hand. Further, the user can operate two of the buttons 3 (the "−" button and the capture button) with the thumb of the left hand. Further, the user can operate the L-button 6*a* and the ZL-button 7*a* with the index finger (or the middle finger) of the left hand. Further, the user can operate the four buttons 2 (the A-button, the B-button, the X-button, and the Y-button), the right analog stick 4*b*, and two of the buttons 3 (the "+" button and the home button) with the thumb of the right hand. Further, the user can operate the R-button 6*b* and the ZR-button 7*b* with the index finger (or the middle finger) of the right hand. It should be noted that FIG. 2 shows the typical manner of holding the game controller 1. The game controller 1 may be held in a different manner depending on the user.

Figure 3:
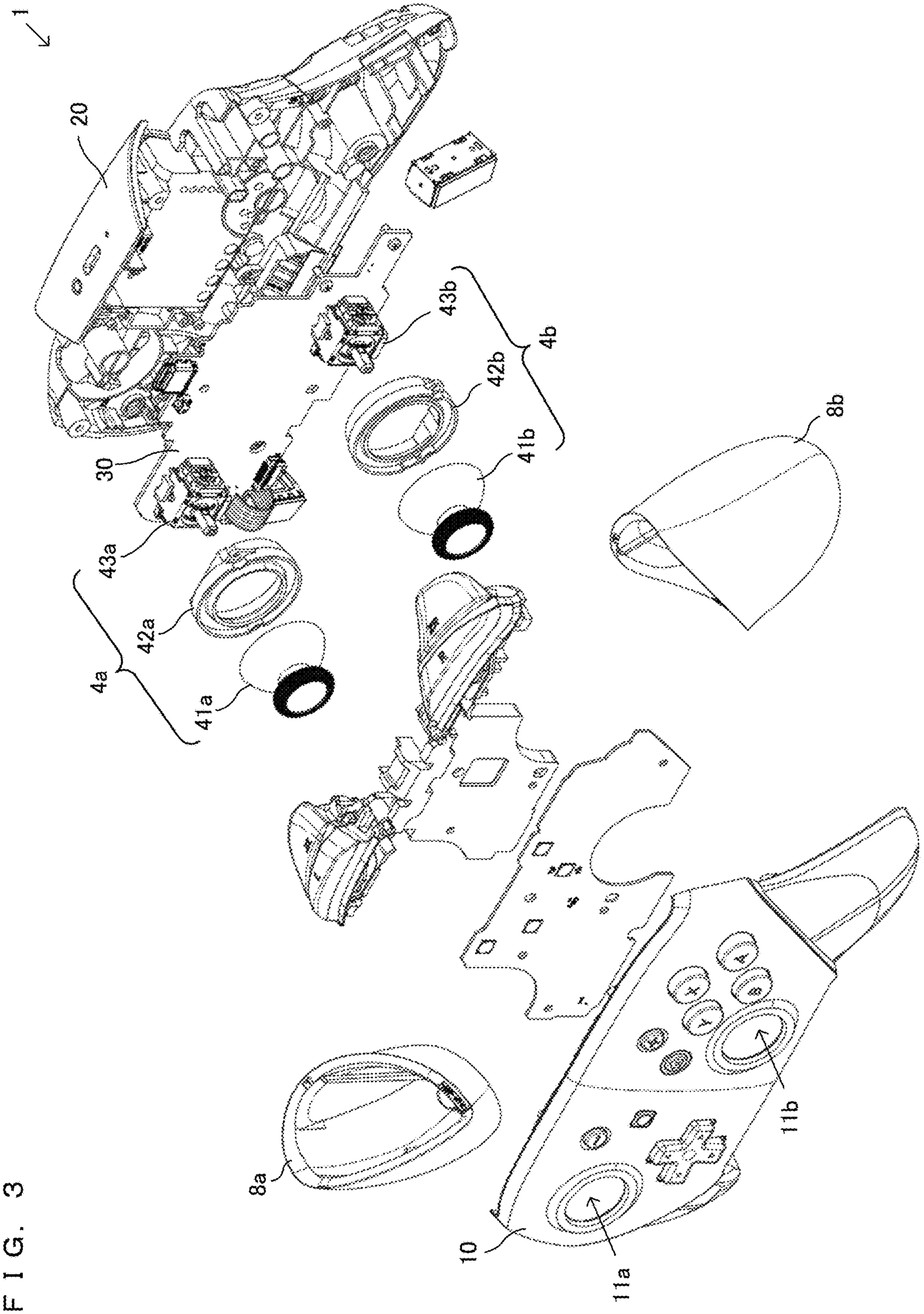
FIG. 3 is an example non-limiting exploded perspective view of the game controller 1.

FIG. 3 is an exploded perspective view of the game controller 1. As shown in FIG. 3, within the game controller 1 (within the housing formed of the first housing 10 and the second housing 20), various members are accommodated.

Specifically, within the game controller 1, a substrate 30, a left analog stick main body part 43*a*, a pedestal 42*a*, and a left operation member 41*a* are accommodated. Further, within the game controller 1, a right analog stick main body part 43*b*, a pedestal 42*b*, and a right operation member 41*b* are accommodated. It should be noted that although various parts are also accommodated within the game controller 1 in addition to these, only portions related to the analog stick 4 will be described below.

The left analog stick 4*a* is formed of the left analog stick main body part 43*a*, the pedestal 42*a*, and the left operation member 41*a*. Further, the right analog stick 4*b* is formed of the right analog stick main body part 43*b*, the pedestal 42*b*, and the right operation member 41*b*. It should be noted that hereinafter, the left analog stick main body part 43*a* and the right analog stick main body part 43*b* will occasionally be collectively referred to as an "analog stick main body part 43". Further, the pedestal 42*a* and the pedestal 42*b* will occasionally be collectively referred to as a "pedestal 42" (an example of a contact target portion). Similarly, the left operation member 41*a* and the right operation member 41*b* will occasionally be collectively referred to as an "operation member 41".

The analog stick main body part 43 is fixed onto the substrate 30. The analog stick main body part 43 includes a stick shaft 431 (see FIG. 10). Although the details will be described later, the stick shaft 431 of the analog stick main body part 43 is inserted into a shaft insertion opening 415 provided in the operation member 41, thereby fixing the operation member 41 to the analog stick main body part 43. Then, a key top of the operation member 41 is exposed through an opening portion 11 (a left opening portion 11*a* or a right opening portion 11*b*) provided in the first housing 10.

The operation member 41 is tilted by the user, thereby inputting a direction. Although the details will be described later, the tilt angle of the operation member 41 is limited by the pedestal 42.

(Details of Operation Member 41 of Analog Stick 4)

Figure 4:
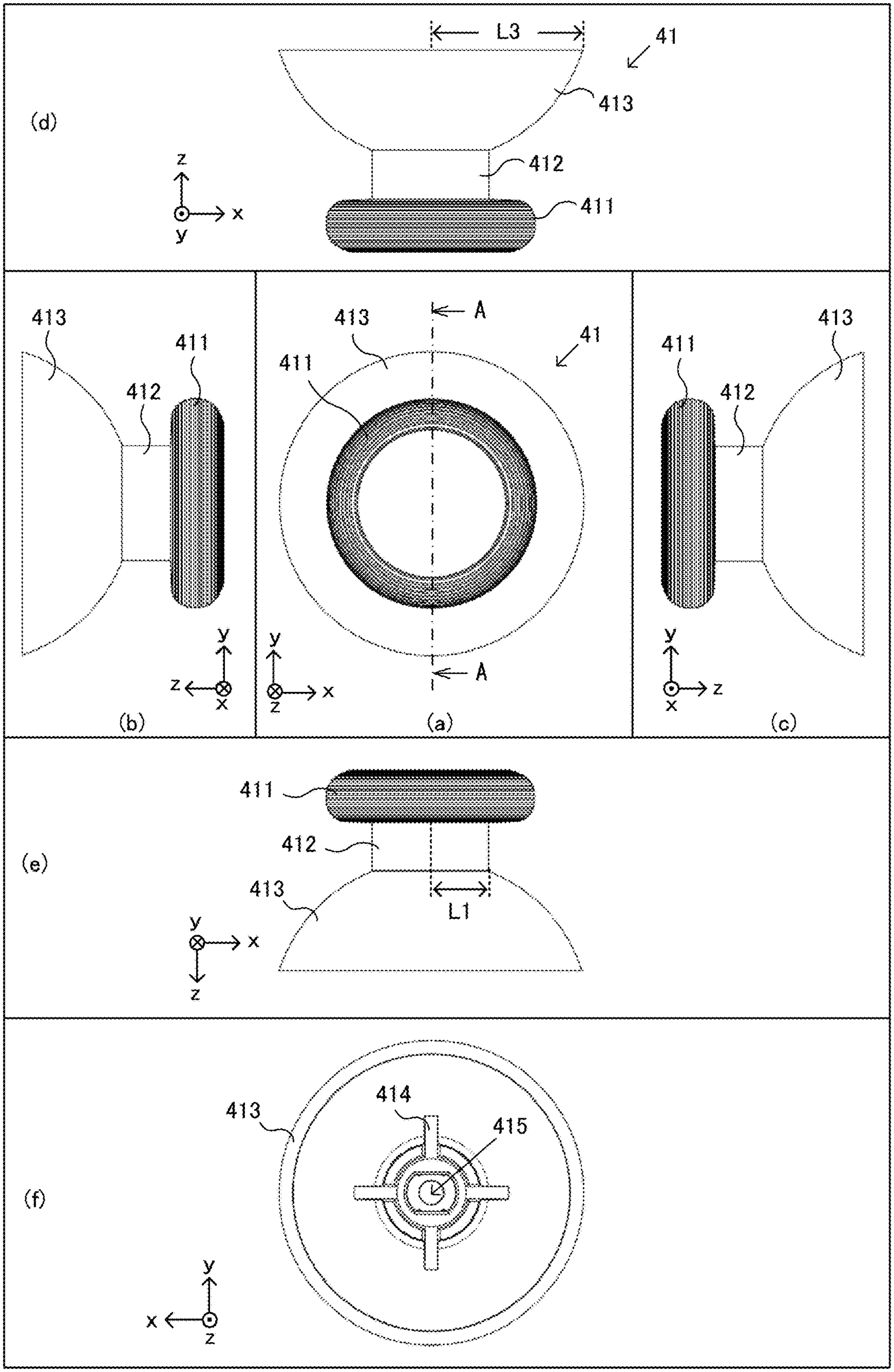
FIG. 4 is example non-limiting external views of an operation member 41 of an analog stick 4.

Next, the details of the operation member 41 of the analog stick 4 are described. FIG. 4 is examples of external views of the operation member 41 of the analog stick 4. (a) of FIG. 4 is a front view of the operation member 41 (a diagram in which only the operation member 41 is viewed from the front surface of the game controller 1 when the operation member 41 is fixed to the game controller 1). (b) of FIG. 4 is a left side view of the operation member 41. (c) of FIG. 4 is a right side view of the operation member 41. (d) of FIG. 4 is a top view of the operation member 41. (e) of FIG. 4 is a bottom view of the operation member 41. (f) of FIG. 4 is a rear view of the operation member 41. It should be noted that an x-axis, a y-axis, and z-axis in FIG. 4 correspond to the x-axis, the y-axis, and the z-axis, respectively, in FIG. 1.

Figure 5A:
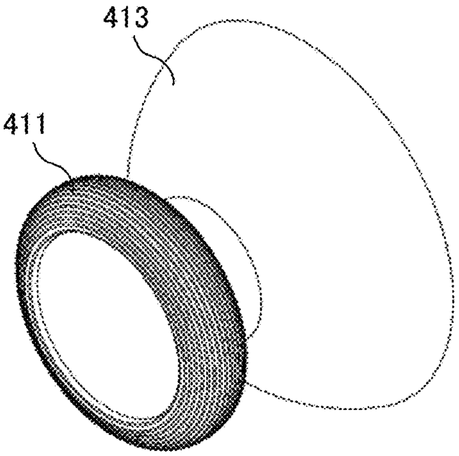
FIG. 5A is an example non-limiting front surface side perspective view of the operation member 41.
Figure 5B:
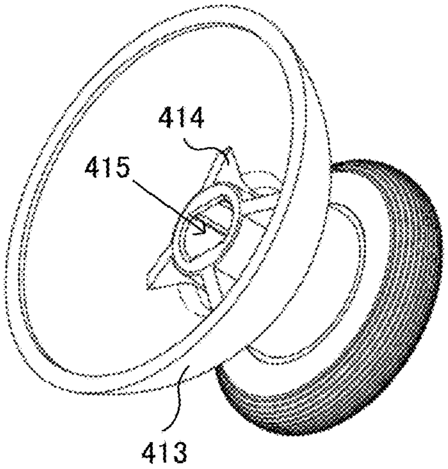
FIG. 5B is an example non-limiting back surface side perspective view of the operation member 41.
Figure 6:
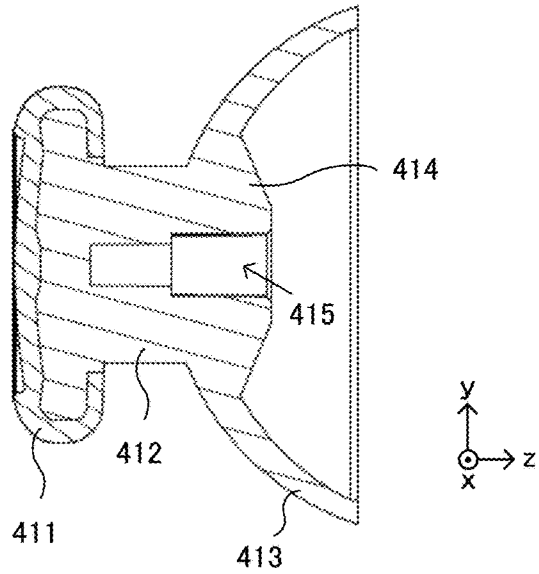
FIG. 6 is an example non-limiting cross-sectional view along a line A-A in (a) of FIG. 4.

FIG. 5A is a front surface side perspective view of the operation member 41. FIG. 5B is a back surface side perspective view of the operation member 41. Further, FIG. 6 is a cross-sectional view along a line A-A in (a) of FIG. 4.

As shown in FIG. 4, the operation member 41 includes a key top 411, a shaft portion 412, and a protruding portion 413. The key top 411 is exposed through the opening portion 11 of the first housing 10 and is a portion to be operated (touched) by the user. The shape of the key top 411 is a circular shape when the game controller 1 is viewed from the front surface.

The shaft portion 412 extends downward from the key top 411 (in the direction in which the buttons 2 of the game controller 1 are pressed; the positive z-axis direction). When the operation member 41 is provided in the game controller 1, the shaft portion 412 extends in the direction from the key top 411 toward the inside of the housing of the game controller 1. The shaft portion 412 has, for example, a columnar shape, and the radius of a bottom surface of the shaft portion 412 is L1. When the operation member 41 is fixed to the analog stick main body part 43 provided on the substrate 30, the shaft portion 412 penetrates through the opening portion 11 of the first housing 10 and exposes the key top 411 to the outside of the housing.

The protruding portion 413 is formed into an umbrella shape and formed such that the further downward (the positive z-axis direction) in the shaft portion 412, the wider. Specifically, the protruding portion 413 protrudes downward from the shaft portion 412 and in a direction away from the center of the shaft portion 412 (the x-axis direction and the y-axis direction, i.e., a direction perpendicular to the direction in which the buttons 2 are pressed). More specifically, as shown in (e) of FIG. 4, the protruding portion 413 has a shape obtained by cutting about half to two-thirds of a hollow ball. The side surface of the protruding portion 413 is arcuate when viewed from a direction parallel to the xy plane. As shown in (f) of FIG. 4, a lower end portion (extremity) of the protruding portion 413 is circular when the operation member 41 is viewed from the back surface. Further, the extremity of the protruding portion 413 may have a round shape. As shown in (d) of FIG. 4, the distance from the center of the shaft portion 412 to the extremity of the protruding portion 413 (i.e., the radius of the circle of the extremity of the protruding portion 413) is L3 (>L1).

Further, as shown in (f) of FIGS. 4, 5B, and 6, inside the protruding portion 413, a plurality of ribs 414 are provided. The ribs 414 are provided along the inside of the protruding portion 413 toward the extremity of the protruding portion 413, thereby preventing the protruding portion 413 from deforming when the operation member 41 is operated. It should be noted that the ribs 414 may be provided so as to extend to the extremity of the protruding portion 413.

Further, inside the protruding portion 413, a shaft insertion opening 415 is provided. Into the shaft insertion opening 415, the stick shaft 431 of the analog stick main body part 43 (see FIG. 10) is inserted. Consequently, the operation member 41 is fixed to the analog stick main body part 43.

The key top 411 is formed of a different material from those of the first housing 10 and the second housing 20 and formed of a material having a higher coefficient of friction than the first housing 10 and the second housing 20 so that the key top 411 is less likely to slip when the user operates the key top 411. Further, the shaft portion 412 and the protruding portion 413 (also the ribs 414 and the shaft insertion opening 415) may be formed of polypropylene. Further, the shaft portion 412 and the protruding portion 413 may be formed of the same material as those of the first housing 10 and the second housing 20. The key top 411, the shaft portion 412, and the protruding portion 413 (also the ribs 414 and the shaft insertion opening 415) may be integrally molded by two-color molding. It should be noted that the key top 411 may be formed of the same material as that of the first housing 10. Further, the shaft portion 412 and the protruding portion 413 may be formed of different materials.

(Details of Pedestal 42 of Analog Stick 4)

Figure 7:
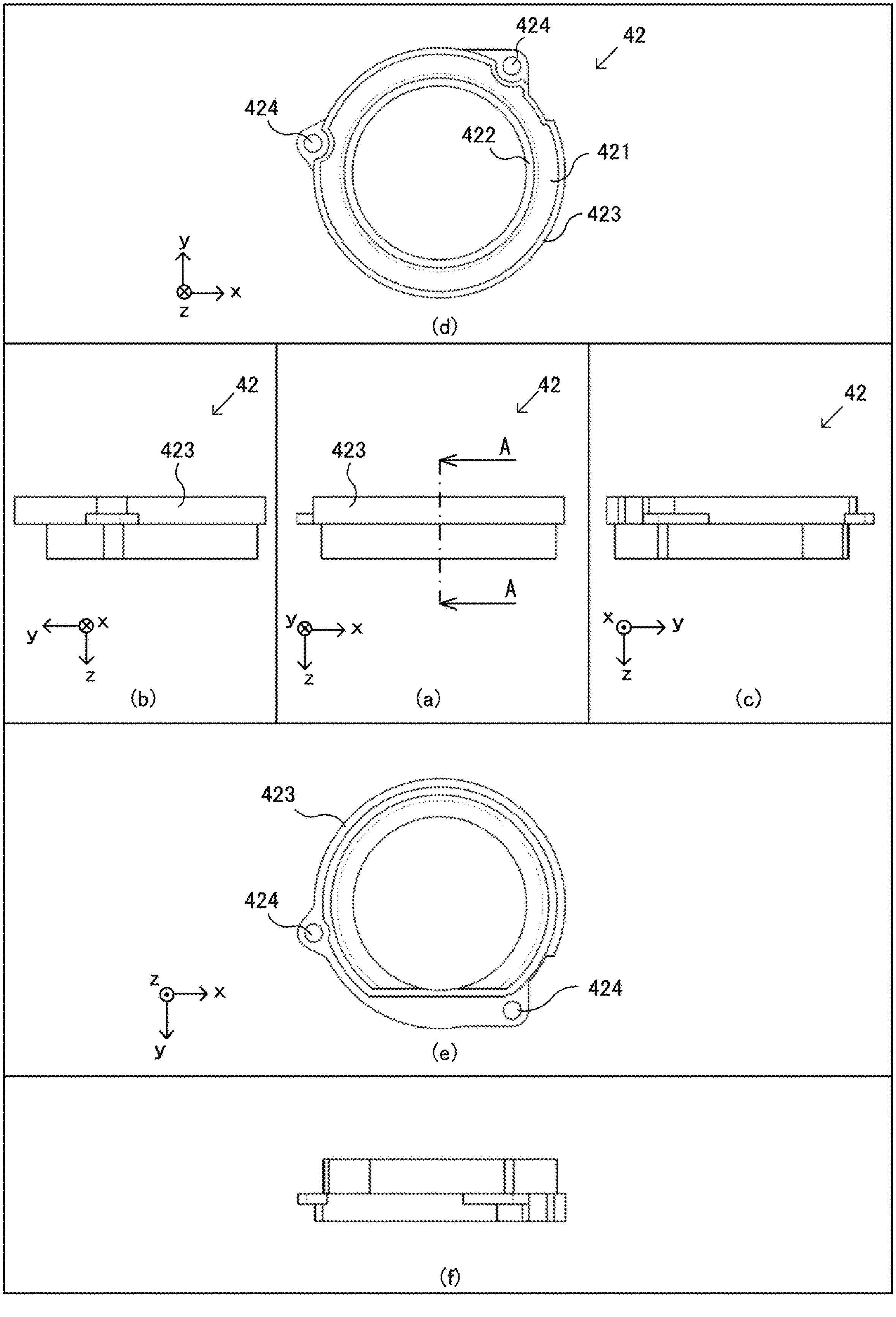
FIG. 7 is example non-limiting external views of a pedestal 42 of the analog stick 4.

FIG. 7 is examples of external views of the pedestal 42 of the analog stick 4. (a) of FIG. 7 is a front view of the pedestal 42. (b) of FIG. 7 is a left side view of the pedestal 42. (c) of FIG. 7 is a right side view of the pedestal 42. (d) of FIG. 7 is a top view of the pedestal 42. (e) of FIG. 7 is a bottom view of the pedestal 42. (f) of FIG. 7 is a rear view of the pedestal 42. It should be noted that a z-axis in FIG. 7 coincides with the z-axis in FIG. 1.

Figure 8A:
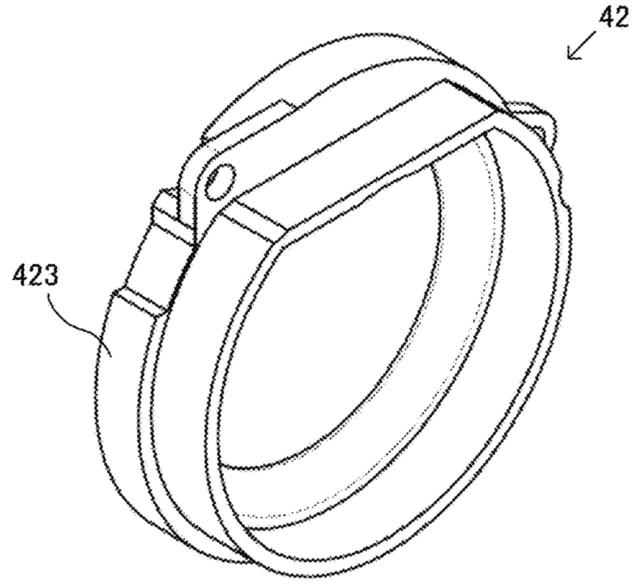
FIG. 8A is an example non-limiting perspective view of the pedestal 42 when viewed from a back surface side.
Figure 8B:
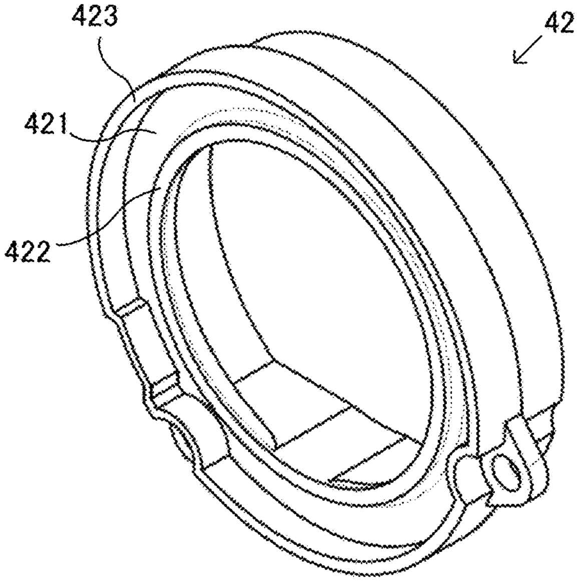
FIG. 8B is an example non-limiting perspective view of the pedestal 42 when viewed from an upper surface side.

FIG. 8A is a perspective view of the pedestal 42 when viewed from the back surface side. FIG. 8B is a perspective view of the pedestal 42 when viewed from the upper surface side. Further, FIG. 9 is a cross-sectional view along a line A-A in (a) of FIG. 7.

The pedestal 42 (an example of a contact target portion) is a member that comes into contact with the protruding portion 413 when the operation member 41 is tilted. As shown in (d) of FIG. 7, the pedestal 42 is a ring-shaped member. The pedestal 42 includes a contact surface 421, an inner wall 422, and an outer wall 423. Further, the pedestal 42 includes two screw holes 424. The pedestal 42 is molded by integral molding. Screws are inserted into the screw holes 424, and the pedestal 42 is screwed, thereby fixing the pedestal 42 to the first housing 10. The pedestal 42 is fixed in the housing such that the contact surface 421 is directed to the front surface side of the game controller 1 (i.e., the normal vector of the contact surface 421 is directed in a negative z-axis direction of the game controller 1). As shown in FIG. 3, the pedestal 42 is disposed further on the front surface side of the game controller 1 than the substrate 30 and the analog stick main body part 43, and the ring-shaped pedestal 42 is disposed so as to surround the analog stick main body part 43.

Figure 9:
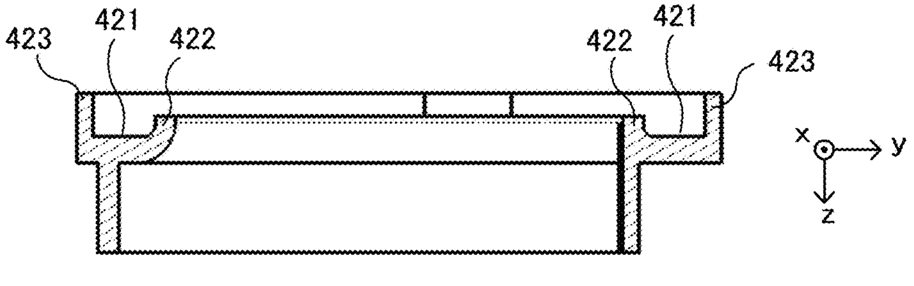
FIG. 9 is an example non-limiting cross-sectional view along a line A-A in (a) of FIG. 7.

As shown in FIG. 9, the contact surface 421 is a flat surface parallel to the xy plane. The outer wall 423 is a surface that extends upward (in the negative z-axis direction) from the contact surface 421 and for example, is perpendicular to the contact surface 421. Further, at least a surface inside the inner wall 422 (a surface that comes into contact with the contact surface 421) is formed, for example, so as to extend upward (in the negative z-axis direction) and toward the center (inside) of the pedestal 42 from the contact surface 421 and have an angle greater than the 90 degrees with respect to the contact surface 421.

The pedestal 42 may be formed of a material having higher sliding properties (a lower coefficient of friction) than the first housing 10 and the second housing 20. Further, the pedestal 42 may be formed of a material having higher sliding properties than the protruding portion 413 of the operation member 41. For example, the pedestal 42 may be formed of a POM (polyacetal) resin, a PA (nylon/polyamide) resin, a PBT resin, or the like. It should be noted that the pedestal 42 may be formed of any material. For example, the pedestal 42 may be formed of the same material as that of the protruding portion 413, or may be formed of the same material as those of the first housing 10 and the second housing 20.

(Limitation on Tilt of Operation Member 41 by Pedestal 42)

Figure 10:
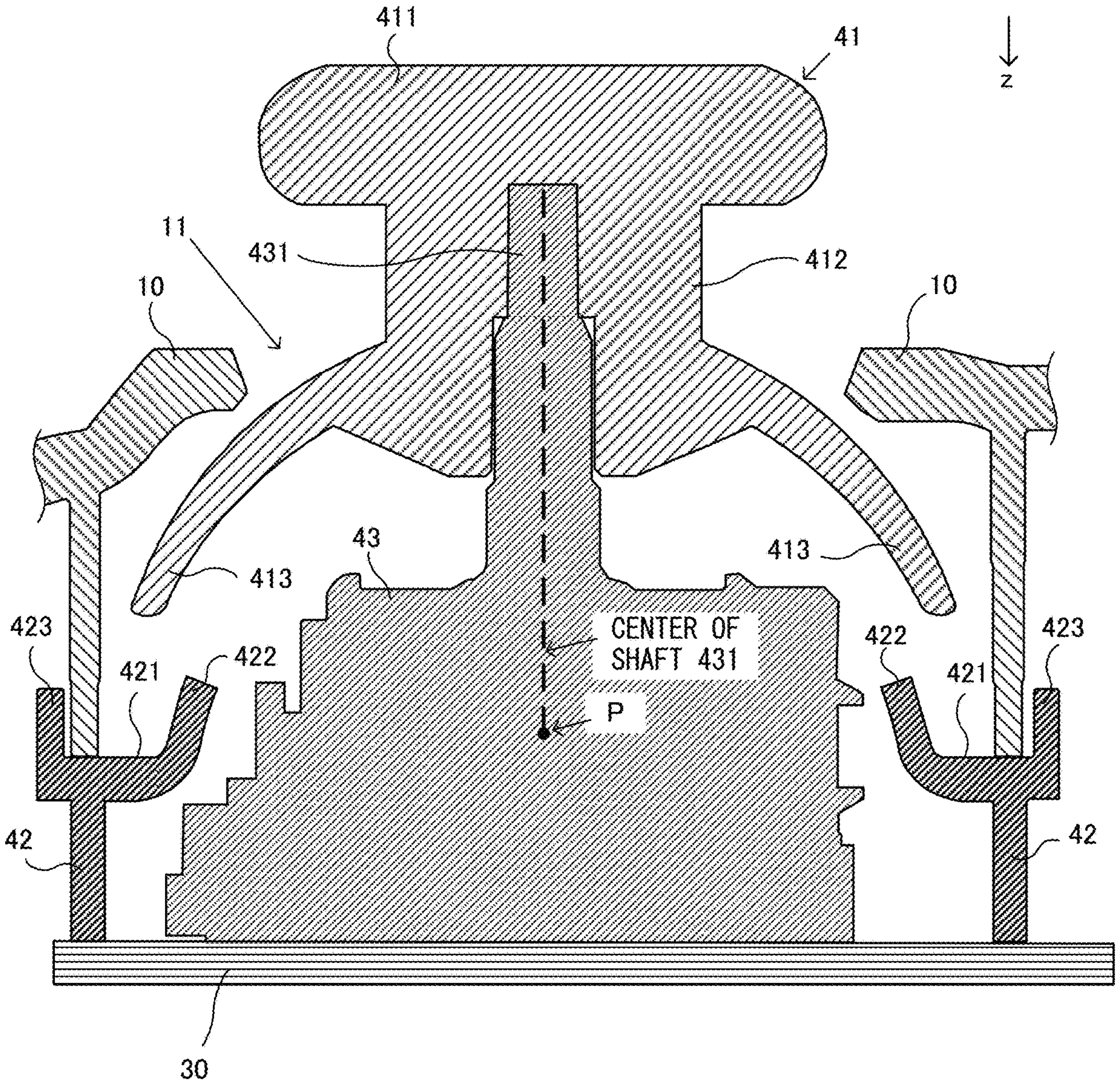
FIG. 10 is an example non-limiting diagram showing an example of an end surface of the game controller 1 when cut in the center of the analog stick 4 in a case where the operation member 41 is not tilted.

FIG. 10 is a diagram showing an example of an end surface of the game controller 1 when cut in the center of the analog stick 4 in a case where the operation member 41 is not tilted. It should be noted that FIG. 10 conceptually shows a portion related to the limitation on the tilt of the operation member 41 by the pedestal 42, and does not show a portion unrelated to the limitation on the tilt of the operation member 41. Further, a down direction in FIG. 10 coincides with the z-axis directions in FIGS. 1, 4, and the like.

As shown in FIG. 10, the stick shaft 431 of the analog stick main body part 43 is inserted into the shaft insertion opening 415 of the operation member 41, and the operation member 41 is fixed to the analog stick main body part 43. The key top 411 of the operation member 41 is exposed through the opening portion 11 of the first housing 10.

The stick shaft 431 of the analog stick main body part 43 is configured to be tilted with a point P as a fulcrum. It should be noted that in FIG. 10, a dashed line in the up-down direction passing through the point P indicates the center of the stick shaft 431 of the analog stick main body part 43. The center of the shaft 431 coincides with the center of the shaft portion 412 of the operation member 41. For example, when a force is applied to the key top 411 of the operation member 41 in the left-right direction in FIG. 10 by the user, the stick shaft 431 of the analog stick main body part 43 is tilted in the left-right direction. Further, when a force is applied to the key top 411 of the operation member 41 in a direction perpendicular to the plane of the paper of FIG. 10, the stick shaft 431 of the analog stick main body part 43 is tilted in the direction perpendicular to the plane of the paper of FIG. 10.

Figure 11:
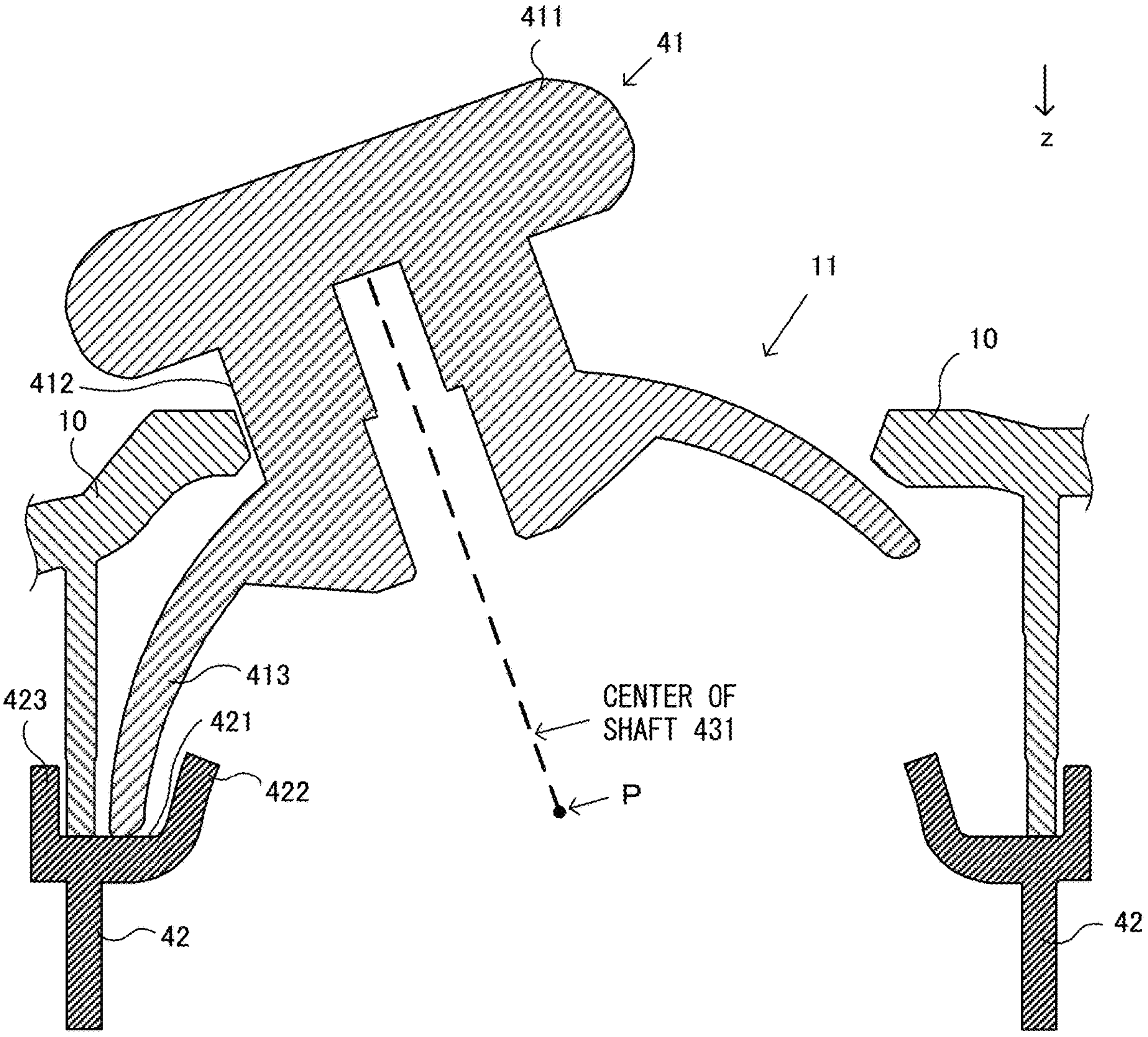
FIG. 11 is an example non-limiting diagram showing an example of the state where the operation member 41 is tilted in a left direction from the state of FIG. 10.
Figure 12:
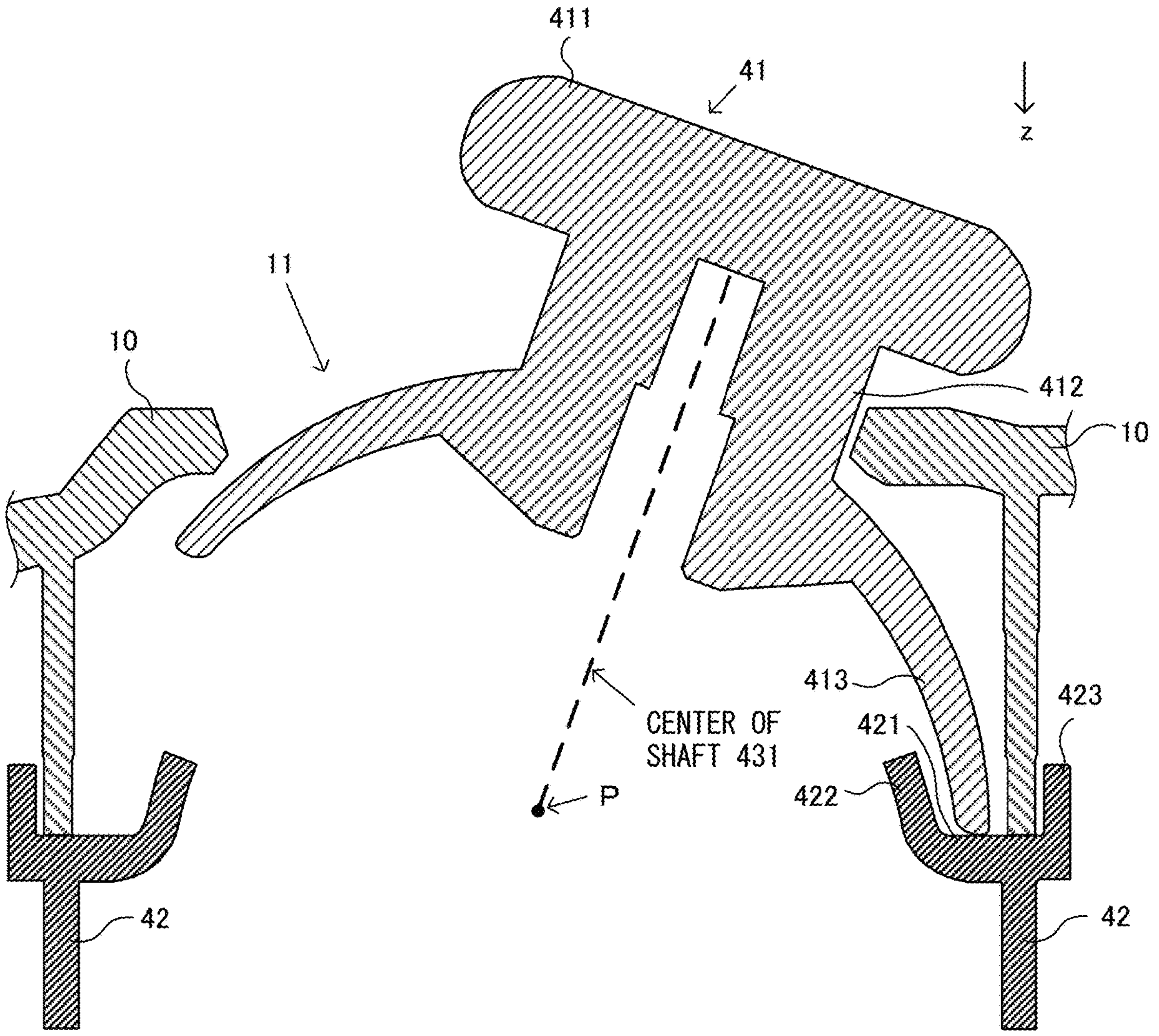
FIG. 12 is an example non-limiting diagram showing an example of the state where the operation member 41 is tilted in a right direction from the state of FIG. 10.

FIG. 11 is a diagram showing an example of the state where the operation member 41 is tilted in the left direction from the state of FIG. 10. FIG. 12 is a diagram showing an example of the state where the operation member 41 is tilted in the right direction from the state of FIG. 10. It should be noted that in FIGS. 11 and 12, for description, the analog stick main body part 43 is omitted except for the point P and the center of the stick shaft 431.

As shown in FIG. 11, when a force is applied to the key top 411 of the operation member 41 in the left direction, the operation member 41 is tilted to the left side and moves in a peripheral direction on the left side of the opening portion 11. Then, within the housing 10, the extremity of the protruding portion 413 comes into contact with the contact surface 421 of the pedestal 42. Thus, the operation member 41 is not tilted any more in the left direction. That is, the extremity of the protruding portion 413 comes into contact with the pedestal 42, thereby limiting the tilt in the left direction of the operation member 41. At this time, the shaft portion 412 of the operation member 41 does not come into contact with the first housing 10.

Further, as shown in FIG. 12, when a force is applied to the key top 411 of the operation member 41 in the right direction, the operation member 41 is tilted to the right side and moves in the peripheral direction on the right side of the opening portion 11. Then, within the housing 10, the extremity of the protruding portion 413 comes into contact with the contact surface 421 of the pedestal 42. Thus, the operation member 41 is not tilted any more in the right direction. That is, the extremity of the protruding portion 413 comes into contact with the pedestal 42, thereby limiting the tilt in the right direction of the operation member 41. At this time, the shaft portion 412 of the operation member 41 does not come into contact with the first housing 10.

The same applies to a case where a force is applied to the key top 411 in any other direction. That is, when a force is applied to the key top 411 in any direction, the operation member 41 is tilted in the direction of the force, and the extremity of the protruding portion 413 comes into contact with the contact surface 421 of the pedestal 42. Consequently, the tilt of the operation member 41 (the movement in the peripheral direction of the opening portion 11) is limited. Even when the operation member 41 is tilted in any direction, the shaft portion 412 of the operation member 41 does not come into contact with the first housing 10. Thus, the user can obtain a non-conventional operational feeling. Further, the protruding portion 413 and the pedestal 42 come into contact with each other within the first housing 10. Thus, a sound associated with the contact is unlikely to leak to outside.

When the tilt of the stick shaft 431 of the analog stick main body part 43 is not limited by another member, the stick shaft 431 itself of the analog stick main body part 43 can be tilted to an angle greater than an angle shown in FIGS. 11 and 12. When the tilt of the stick shaft 431 of the analog stick main body part 43 is not limited by another member, the tilt of the stick shaft 431 of the analog stick main body part 43 can be tilted in any direction and at any angle up to a predetermined angle (e.g., 20 degrees, 30 degrees, or 45 degrees) with the state shown in FIG. 10 as a tilt angle of "0 degrees". However, when the analog stick main body part 43 is accommodated in the housing of the game controller 1, then as described above, the angle at which the operation member 41 is tilted is limited by the protruding portion 413 and the pedestal 42.

It should be noted that also when the tilt of the operation member 41 is limited by the protruding portion 413 and the pedestal 42, the shaft portion 412 of the operation member 41 and the first housing 10 may come into contact with each other. In this case, when the operation member 41 is tilted, the protruding portion 413 and the pedestal 42 may come into contact with each other before the shaft portion 412 and the first housing 10 come into contact with each other. That is, the operation member 41 is tilted, and the protruding portion 413 and the pedestal 42 come into contact with each other, and a force is further applied to elastically deform the protruding portion 413 or the pedestal 42, whereby the shaft portion 412 of the operation member 41 and the first housing 10 may come into contact with each other. Further, when the operation member 41 is tilted, the protruding portion 413 and the pedestal 42 may come into contact with each other, and simultaneously, the shaft portion 412 and the first housing 10 may come into contact with each other.

Further, on the contact surface 421 of the pedestal 42, a sheet (e.g., a nylon sheet, a fluorine sheet, or the like) having higher sliding properties than the pedestal 42 and the protruding portion 413 may be provided. A sheet having high sliding properties is provided on the contact surface 421, whereby it is possible to reduce resistance that occurs between the protruding portion 413 and the contact surface 421. Further, the protruding portion 413 may be formed of a material having higher sliding properties than the pedestal 42. That is, a material having high sliding properties may be used for at least a portion where the protruding portion 413 and the pedestal 42 come into contact with each other.

Further, on the contact surface 421 of the pedestal 42, a sheet-like cushioning material for absorbing shock may be provided. The cushioning material may be a material having higher shock absorption than the material of the pedestal 42, and may be formed of a foamed resin such as foamed polyurethane, foamed polyethylene, or the like. The cushioning material is provided on the contact surface 421, whereby it is possible to reduce sound generated when the protruding portion 413 comes into contact with the contact surface 421. Further, the cushioning material may be provided at the extremity of the protruding portion 413, or the entirety of the protruding portion 413 may be formed of the cushioning material. That is, the cushioning material may be provided in at least a portion where the protruding portion 413 and the pedestal 42 come into contact with each other.

The material of the protruding portion 412 of the operation member 41, the material of the pedestal 42, the presence or absence of a sheet on the contact surface 421 of the pedestal 42, and the material of a sheet may be optionally combined. For example, when a material having higher sliding properties than the protruding portion 413 is selected as the material of the pedestal 42, a sheet may not be provided, or a sheet having high cushioning properties may be provided. Further, when the same material as that of the protruding portion 413 is selected as the material of the pedestal 42, a sheet having higher sliding properties than the pedestal 42, a sheet having high cushioning properties, or a sheet having these properties may be provided on the contact surface 421.

Further, the contact surface 421 of the pedestal 42 and/or the extremity of the protruding portion 413 may be formed of a metal. In this case, when the extremity of the protruding portion 413 comes into contact with the contact surface 421, a metallic sound is generated. Consequently, the user can generate a relatively large operation sound by operating the analog stick 4 and transmit the operation sound also to outside the first housing 10. In this manner, it is possible to configure the game controller 1 more preferable for a user who likes an operation sound.

Here, it is also possible that the shaft portion 412 of the operation member 41 and the first housing 10 are brought into contact with each other, thereby limiting the tilt of the operation member 41. A description is given below of the difference between a configuration for limiting the tilt of the operation member 41 by the contact between the shaft portion 412 of the operation member 41 and the first housing 10, and a configuration for limiting the tilt of the operation member 41 by the contact between the protruding portion 413 and the pedestal 42 as in the exemplary embodiment.

Figure 13:
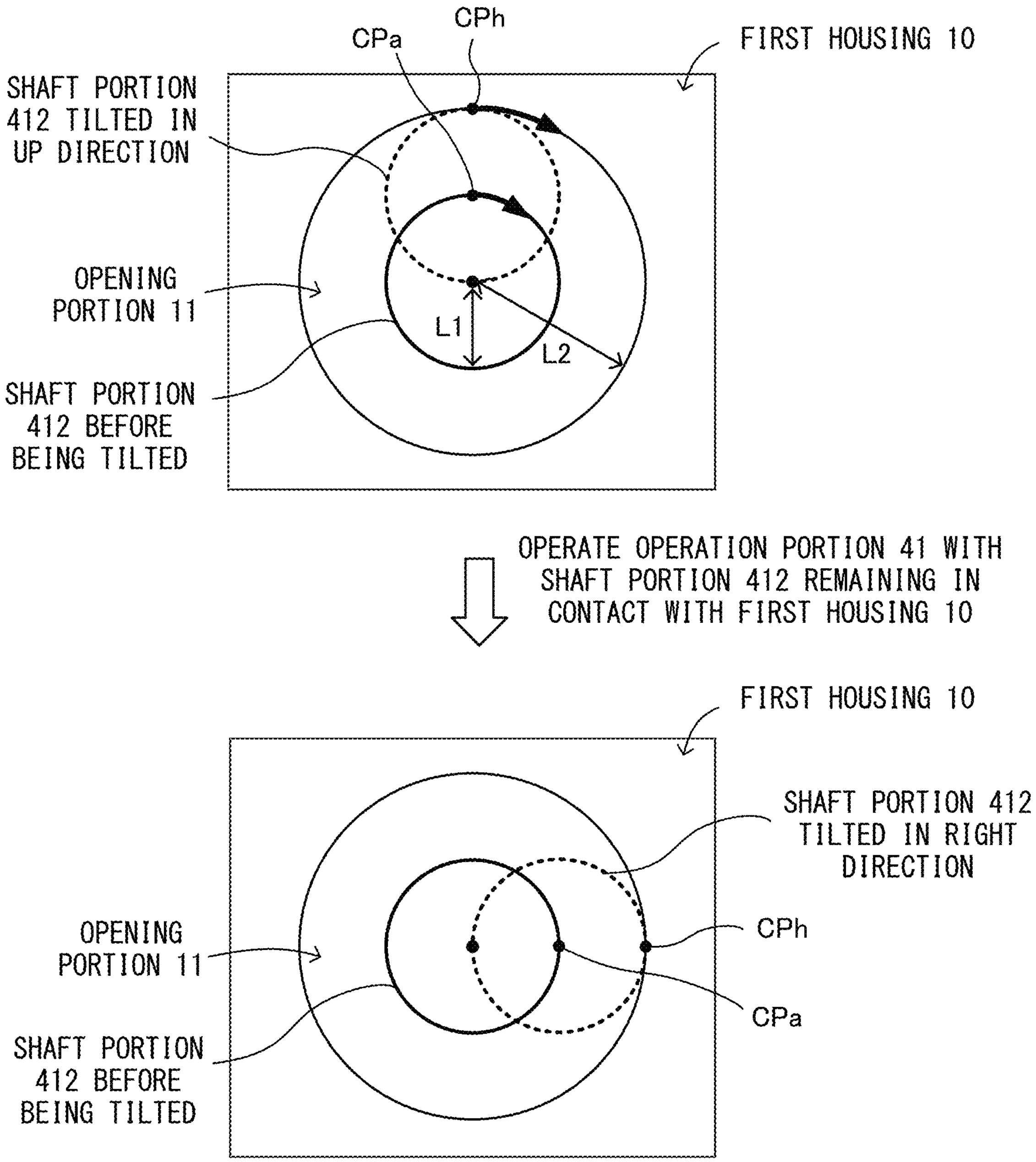
FIG. 13 is an example non-limiting diagram showing an example of the state where contact points move when the tilt of the operation member 41 is limited by the contact between a shaft portion 412 of the operation member 41 and a first housing 10.

FIG. 13 is a diagram showing an example of the state where contact points move when the tilt of the operation member 41 is limited by the contact between the shaft portion 412 of the operation member 41 and the first housing 10. FIG. 13 shows parts of the shaft portion 412 of the operation member 41 and the first housing 10 when viewed from the front surface of the game controller 1. The depth direction of the plane of the paper of FIG. 13 coincides with the z-axis in FIG. 1.

Figure 14:
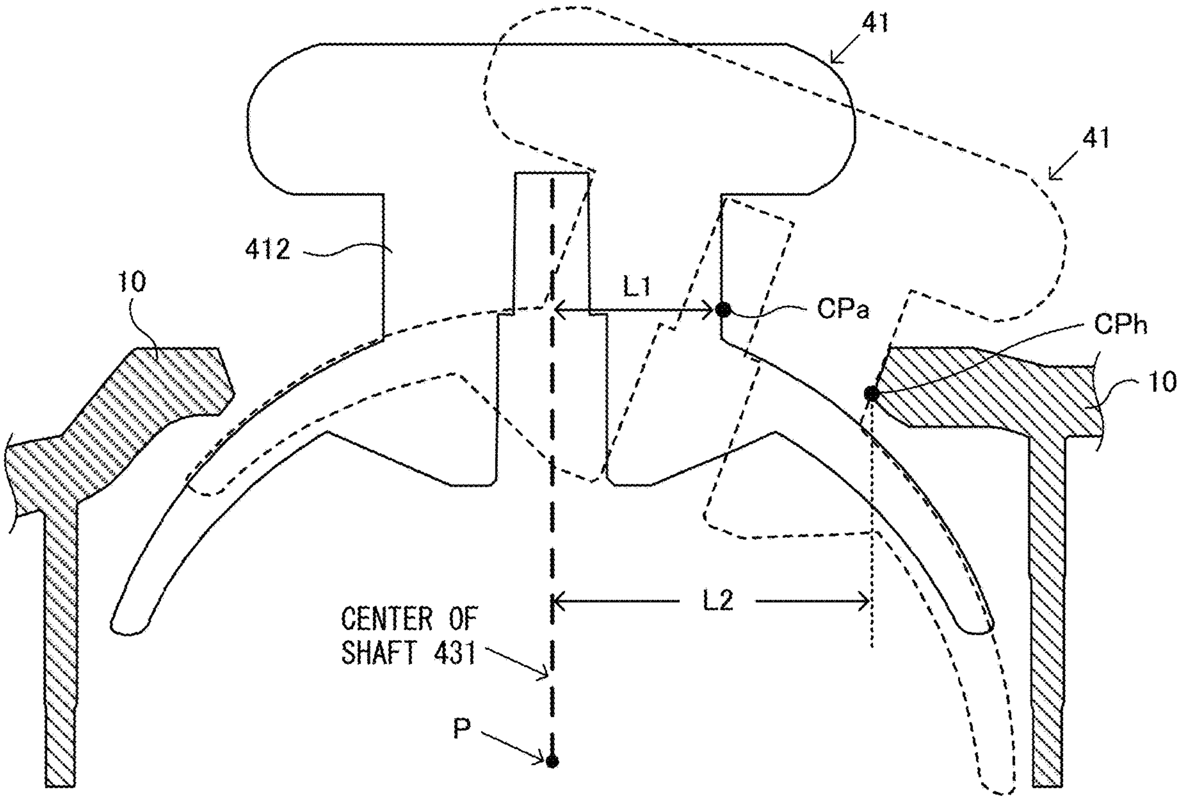
FIG. 14 is an example non-limiting diagram showing an example of the state where the shaft portion 412 of the operation member 41 and the first housing 10 come into contact with each other in a configuration in which the pedestal 42 is not provided.

FIG. 14 is a diagram showing an example of the state where the shaft portion 412 of the operation member 41 and the first housing 10 come into contact with each other in a configuration in which the pedestal 42 is not provided. In FIG. 14, the operation member 41 before being tilted is indicated by a solid line, and the operation member 41 when the operation member 41 is tilted and the shaft portion 412 is in contact with the first housing 10 is indicated by a dashed line.

As shown in FIG. 13, before the operation member 41 is tilted, the center of the shaft portion 412 of the operation member 41 is located at the center of the circular opening portion 11 of the first housing 10. As shown in FIGS. 13 and 14, the radius of the shaft portion 412 of the operation member 41 is L1, and the radius of the opening portion 11 of the first housing 10 is L2 (>L1).

As shown in FIG. 13, for example, the operation member 41 is tilted in the up direction, the shaft portion 412 of the operation member 41 and the first housing 10 come into contact with each other. At this time, a contact point on the shaft portion 412 side is a point CPa, and a contact point on the first housing 10 side is a point CPh.

When the operation member 41 is operated so as to draw a circle (i.e., when the input direction of the analog stick 4 is changed with the shaft portion 412 remaining in contact with the first housing 10), then as shown in FIG. 13, the contact point CPa moves in the direction of an arrow in FIG. 13 on the circumference of the shaft portion 412. Further, the contact point CPh moves in the direction of an arrow in FIG. 13 along the periphery of the opening portion 11. The shaft portion 412 of the operation member 41 does not rotate about the shaft portion 412. Thus, the distance at which the contact point CPa moves is shorter than the distance at which the contact point CPh moves. Thus, when the operation member 41 is operated so as to draw a circular arc (when the input direction of the analog stick 4 is changed from the up direction to the right direction with the shaft portion 412 remaining in contact with the first housing 10), the shaft portion 412 moves from the position in the upper diagram to the position in the lower diagram in FIG. 13 while sliding on the periphery of the opening portion 11 of the first housing 10.

That is, there is a difference (hereinafter, “DF1”) between the length of a portion of the shaft portion 412 that comes into contact with the first housing 10 (the perimeter of the shaft portion 412) and the length of a portion of the first housing 10 that comes into contact with the shaft portion 412 (the perimeter of the opening portion 11). Specifically, the difference DF1 is $2\pi\times(L2-L1)$. When a circle is drawn while the shaft portion 412 is in contact with the first housing 10, the shaft portion 412 slides by the difference DF1.

Thus, when the operation member 41 is operated so as to draw a circle, there is a possibility that resistance occurs in a direction opposite to the operation direction by the friction between the shaft portion 412 and the first housing 10 and influences the operability.

In response to this, in the exemplary embodiment, the tilt of the operation member 41 is limited by the contact between the protruding portion 413 of the operation member 41 and the pedestal 42.

Figure 15:
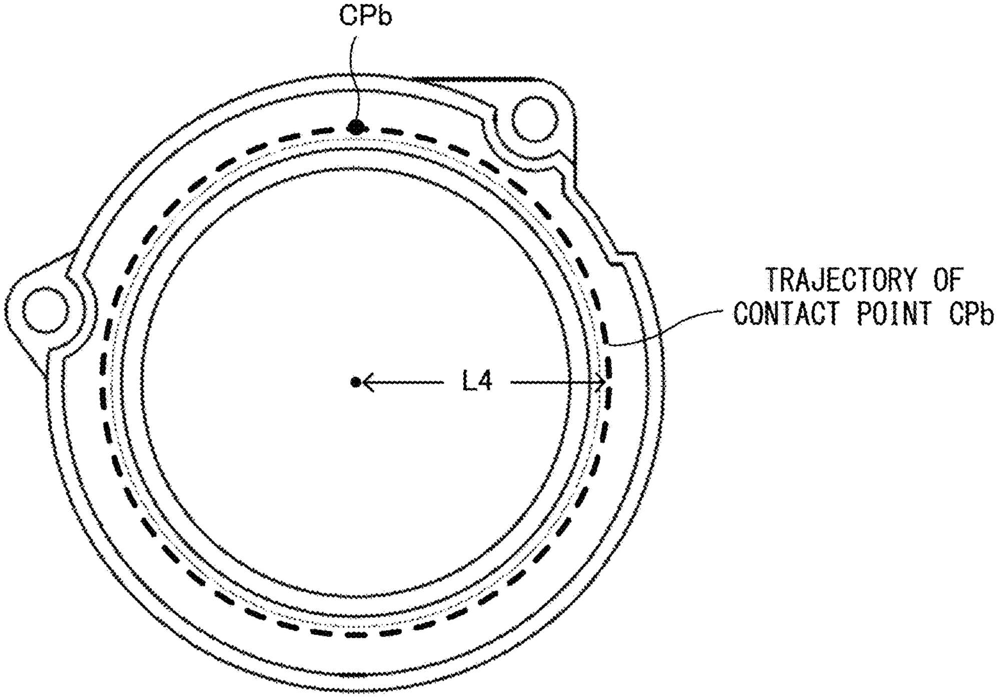
FIG. 15 is an example non-limiting diagram showing an example of the trajectory of a contact point when the tilt of the operation member 41 is limited by the contact between a protruding portion 413 of the operation member 41 and the pedestal 42.

FIG. 15 is a diagram showing an example of the trajectory of a contact point when the tilt of the operation member 41 is limited by the contact between the protruding portion 413 of the operation member 41 and the pedestal 42. FIG. 15 shows a view of the pedestal 42 of the operation member 41 from the front surface of the game controller 1. The depth direction of the plane of the paper in FIG. 15 coincides with the z-axis in FIG. 1.

Figure 16:
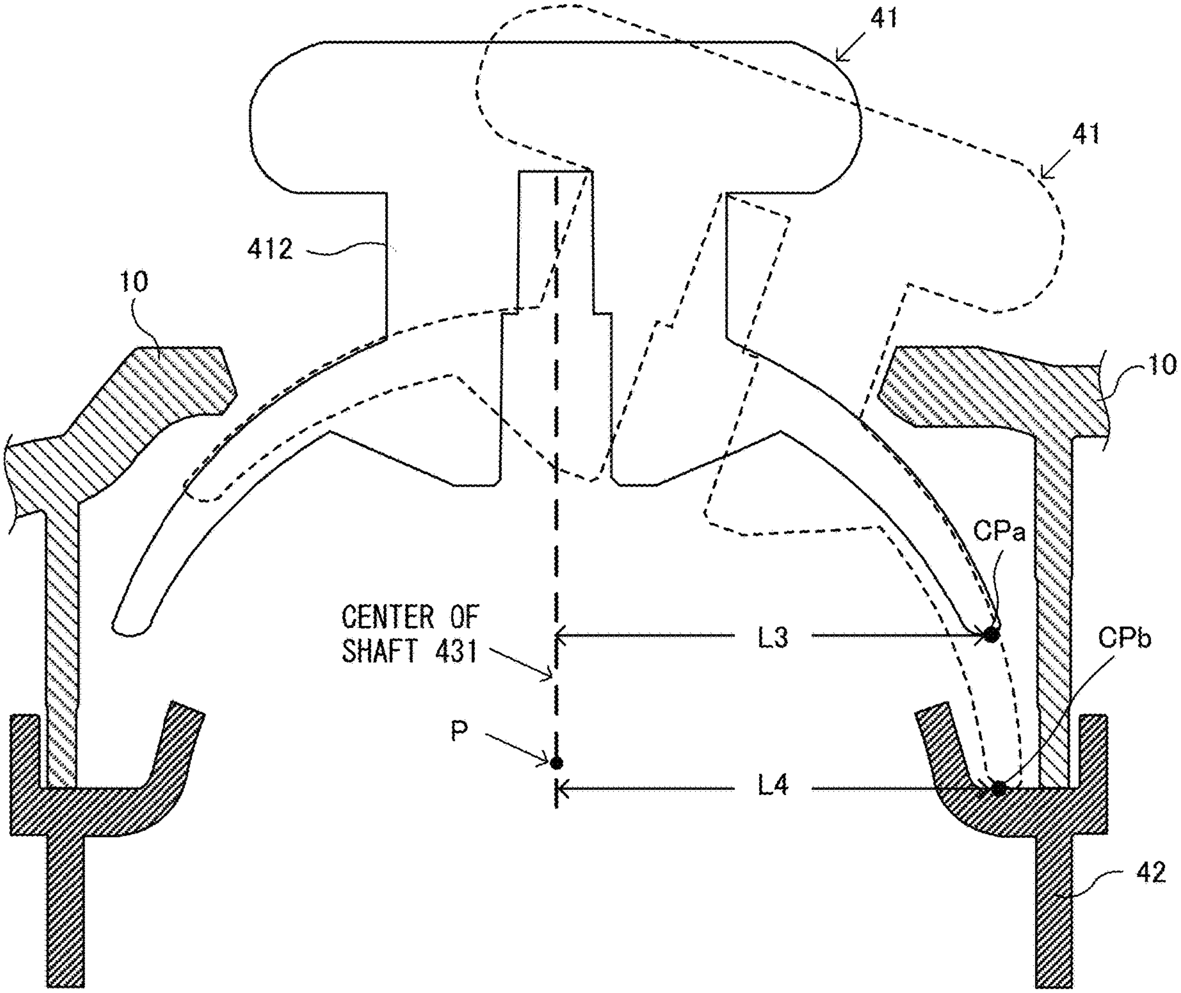
FIG. 16 is an example non-limiting diagram showing an example of the state where the protruding portion 413 of the operation member 41 and the pedestal 42 come into contact with each other.

FIG. 16 is a diagram showing an example of the state where the protruding portion 413 of the operation member 41 and the pedestal 42 come into contact with each other. In FIG. 16, the operation member 41 before being tilted is indicated by a solid line, and the operation member 41 when the operation member 41 is tilted and the protruding portion 413 is in contact with the pedestal 42 is indicated by a dashed line.

As shown in FIG. 16, a contact point on the protruding portion 413 side when the extremity of the protruding portion 413 of the operation member 41 and the pedestal 42 are in contact with each other is a point CPa, and a contact point on the pedestal 42 side is a point CPb. When the operation member 41 is operated so as to draw a circle (i.e., when the input direction of the analog stick 4 is changed with the protruding portion 413 remaining in contact with the pedestal 42), then as shown in FIG. 15, the contact point CPb of the pedestal 42 moves so as to draw a circle. In FIG. 15, a dashed line indicates the trajectory of the contact point CPb.

As shown in FIG. 16, the distance between the contact point CPa (the extremity of the protruding portion 413) and the center of the stick shaft 431 when the operation member 41 is not tilted (i.e., the radius of the circle of the extremity of the protruding portion 413) is L3. When the operation member 41 is tilted in the right direction, the extremity of the protruding portion 413 moves and comes into contact with the pedestal 42. At this time, the distance between the center of the stick shaft 431 and the contact point CPb of the pedestal 42 is L4. Here, the distance L3 and the distance L4 are approximately equal to each other. That is, the length of the circumference of the circle of the extremity (the contact point CPa) of the protruding portion 413 is approximately equal to the length of the circumference of the circle of the trajectory of the contact point CPb of the pedestal 42 shown in FIG. 15. That is, when the operation member 41 is operated so as to draw a circle (i.e., when the input direction of the analog stick 4 is changed with the extremity of the protruding portion 413 remaining in contact with the pedestal 42), the distance at which the contact point CPa at the extremity of the protruding portion 413 moves and the distance at which the contact point CPb of the pedestal 42 shown in FIG. 15 moves are approximately equal to each other.

That is, the difference (hereinafter, “DF2”) between the length of a portion of the protruding portion 413 that comes into contact with the pedestal 42 (the perimeter of the extremity of the protruding portion 413) and the length of a portion of the pedestal 42 that comes into contact with the protruding portion 413 (the perimeter of the contact surface 421 of the pedestal 42) is smaller than the difference DF1. When the operation member 41 is operated so as to draw a circle while the protruding portion 413 is in contact with the pedestal 42, the extremity of the protruding portion 413 slides by the difference DF2, but the difference DF2 is approximately “0”.

Thus, when the operation member 41 is operated so as to draw a circle, the extremity of the protruding portion 413 rolls without sliding on the contact surface 421 of the pedestal 42. Thus, when the operation member 41 is operated so as to draw a circle, it is possible to suppress resistance when the operation is performed.

Further, the extremity of the protruding portion 413 is formed into a round shape. Thus, when the extremity of the protruding portion 413 comes into contact with the contact surface 421 of the pedestal 42, a force is dispersed. It should be noted that the extremity of the protruding portion 413 may be formed into a planar shape, and the extremity of the protruding portion 413 and the contact surface 421 may be configured to come into planar contact with each other.

Further, in the pedestal 42, the inner wall 422 and the outer wall 423 extending upward (in the negative z-axis direction) above the contact surface 421 are provided. Thus, it is possible to prevent a position shift between the operation member 41 and the pedestal 42.

Further, the inner wall 422 of the pedestal 42 is formed so as to extend upward and toward the center of the shaft portion 412. Thus, it is possible to secure the path on which the protruding portion 413 moves when the operation member 41 is tilted. Even when the operation member 41 is tilted, it is possible to prevent the protruding portion 413 from hitting the inner wall 422. Further, even when an error in manufacturing or assembling occurs, it is possible to sufficiently secure the path on which the protruding portion 413 moves.

It should be noted that the difference DF2 does not necessarily need to be "0". That is, there may be some difference between the length of the portion of the protruding portion 413 that comes into contact with the pedestal 42 (the perimeter of the extremity of the protruding portion 413) and the length of the portion of the pedestal 42 that comes into contact with the protruding portion 413 (the perimeter of the contact surface 421 of the pedestal 42). Also in this case, the difference DF2 is smaller than the difference DF1.

Figure 17:
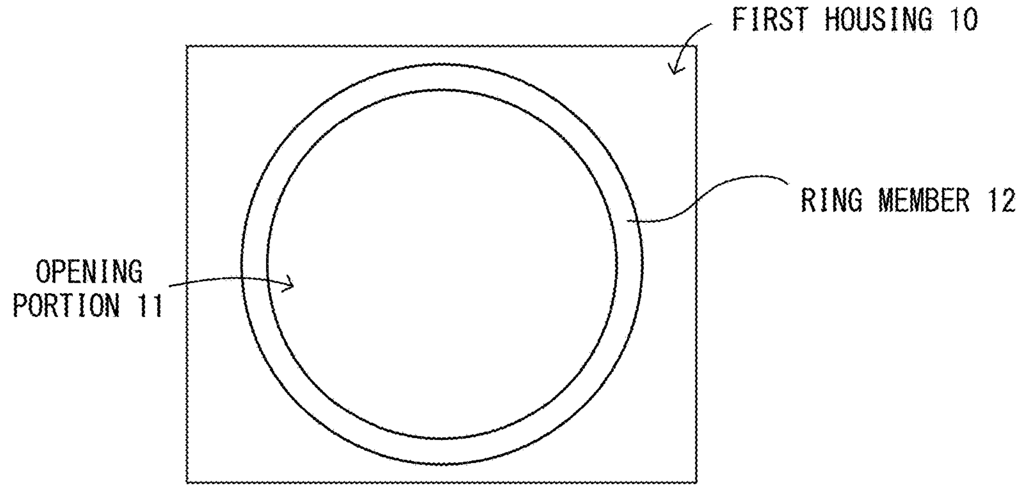
FIG. 17 is an example non-limiting diagram showing an example of a partially enlarged view when a ring member 12 is provided in an opening portion 11 of the first housing 10.

It should be noted that a ring member may be provided in the periphery of the opening portion 11 of the first housing 10. FIG. 17 is a diagram showing an example of a partially enlarged view when a ring member 12 is provided in the opening portion 11 of the first housing 10. As shown in FIG. 17, the ring member 12 is provided so as to cover the periphery of the opening portion 11. The ring member 12 may be formed of a material having higher sliding properties than the first housing 10 (e.g., a POM resin, a PA (nylon/polyamide) resin, a PBT resin, or the like). The ring member 12 may be formed as a component different from the first housing 10 and bonded to the first housing 10, or may be formed with the first housing 10 by integral molding. Further, the ring member 12 may be formed in a color different from that of the first housing 10.

Figure 18:
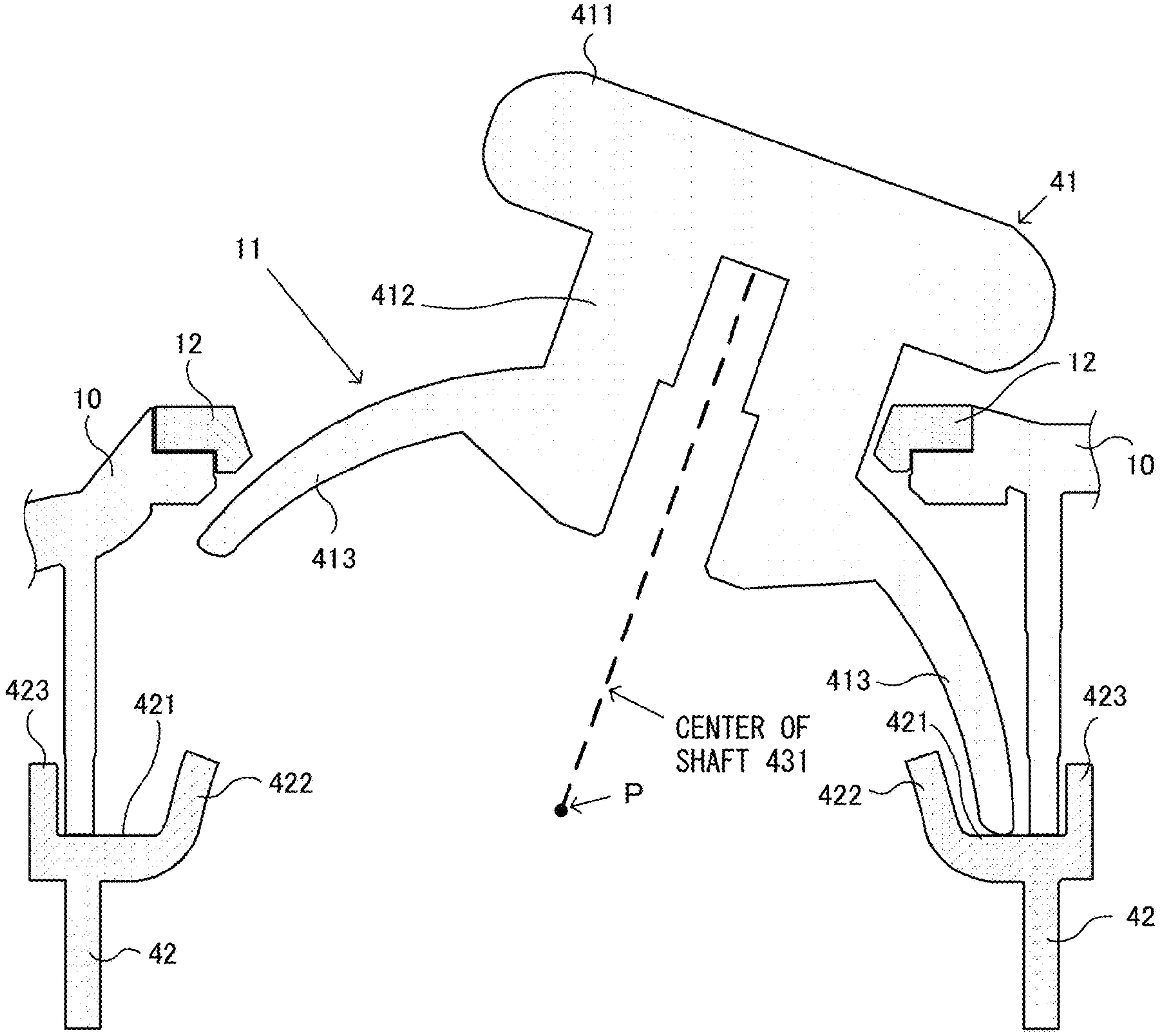
FIG. 18 is an example non-limiting diagram showing an example of an end surface of the game controller 1 when cut in the center of the analog stick 4 in a configuration in which the ring member 12 is provided in the periphery of the opening portion 11 of the first housing 10.

FIG. 18 is a diagram showing an example of an end surface of the game controller 1 when cut in the center of the analog stick 4 in the configuration in which the ring member 12 is provided in the periphery of the opening portion 11 of the first housing 10. As shown in FIG. 18, when the operation member 41 is tilted in the right direction, the pedestal 42 limits the tilt of the operation member 41. In this case, the shaft portion 412 of the operation member 41 does not come into contact with the ring member 12. The same applies to a case where the operation member 41 is tilted in any direction.

As described above, when the ring member 12 having high sliding properties is provided in the periphery of the opening portion 11 of the first housing, and even if the shaft portion 412 and the ring member 12 come into contact with each other, it is possible to make resistance that occurs between the shaft portion 412 and the ring member 12 when the operation member 41 is operated so as to draw a circle, relatively small.

As described above, the game controller 1 according to the exemplary embodiment includes the housing including the opening portion 11, and the operation member 41. The operation member 41 includes the key top 411 to be operated by the user, the shaft portion 412 extending downward from the key top, and the protruding portion 413 protruding from the shaft portion 412. Within the housing (the first housing 10 and the second housing), the pedestal 42 is provided that comes into contact with the protruding portion 413 when the operation member 41 is tilted. Thus, it is possible to limit the tilt of the operation member 41 by the pedestal 42 and the protruding portion 413. That is, by the protruding portion 413 and the pedestal 42, it is possible to limit the movement of the operation member 41 in the peripheral direction of the opening portion 11. Further, when the pedestal 42 is formed of a material having high sliding properties, it is possible to suppress resistance that occurs between the pedestal 42 and the extremity of the protruding portion 413.

Further, the perimeter of the extremity of the protruding portion 413 and the perimeter of the portion of the contact surface 421 of the pedestal 42 that comes into contact with the extremity of the protruding portion 413 are approximately equal to each other. Thus, when the operation member 41 is operated so as to draw a circle, the protruding portion 413 rolls without sliding on the contact surface 421 of the pedestal 42. Consequently, it is possible to make the operability excellent.

Further, when the ring member 12 is provided in the periphery of the opening portion 11 of the first housing 10, the shaft portion 412 comes into contact with the ring member 12, and does not come into direct contact with the shaft portion 412 and the first housing 10. The ring member 12 is formed of a material having higher sliding properties than the first housing 10. Thus, it is possible to reduce resistance force to be generated by the shaft portion 412 and the ring member 12 coming into contact with each other, as compared with resistance force to be generated by the shaft portion 412 and the first housing 10 coming into contact with each other.

(Variations)

While the exemplary embodiment has been described above, various variations may be made in another exemplary embodiment.

For example, in the above exemplary embodiment, the pedestal 42 is a ring-shaped member, and the contact surface 421 is a flat surface. In another exemplary embodiment, the contact surface 421 may have recesses and protrusions. For example, the contact surface 421 may include recessed portions or protruding portions in four directions, namely up, down, left, and right directions, or eight directions, namely up, down, left, right, and oblique directions.

Figure 19:
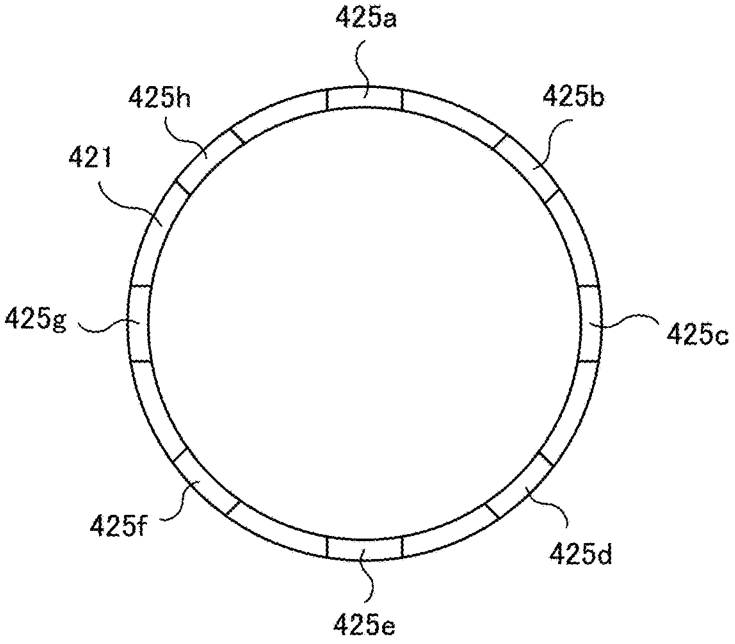
FIG. 19 is an example non-limiting diagram showing an example of a contact surface 421 when recessed portions are formed on the contact surface 421 of the pedestal 42.

FIG. 19 is a diagram showing an example of the contact surface 421 when recessed portions are formed on the contact surface 421 of the pedestal 42. FIG. 19 shows the contact surface 421 of the pedestal 42. As shown in FIG. 19, in four directions, namely up, down, left, and right directions, and four oblique directions on the ring-shaped contact surface 421, recessed portions 425 (425*a* to 425*h*) may be formed. The recessed portions 425 are portions formed into recessed shapes in the depth direction of the plane of the paper in FIG. 19, and for example, may be formed into arcuate shapes. The contact surface 421 between two of the recessed portions 425 may be formed into a flat surface, or may be formed into a protruding shape. When such a pedestal 42 is used, it is possible to guide the inputs of the eight directions. For example, when the user inputs the up direction, the extremity of the protruding portion 413 of the operation member 41 is fitted to the recessed portion 425*a*, thereby facilitating the input of the up direction.

It should be noted that the recesses and protrusions shown in FIG. 19 may be provided in the protruding portion 413. That is, a configuration may be employed in which the recesses and protrusions are provided at the extremity of the protruding portion 413, thereby guiding the inputs of predetermined directions (four directions, namely up, down, left, and right directions, and four oblique directions, or other directions).

Further, in the above exemplary embodiment, the opening portion 11 of the first housing 10 has a circular shape. Alternatively, in another exemplary embodiment, the shape of the opening portion 11 may be an ellipse, or may be a polygon (e.g., an octagon). Also in this case, as described above, a configuration is employed in which the tilt of the operation member 41 is limited by the protruding portion 413 of the operation member 41 and the pedestal 42 coming into contact with each other, so that the shaft portion 412 of the operation member 41 does not come into contact with, or is less likely to come into contact with, the periphery of the opening portion of the first housing 10.

Further, the shapes of the key top 411, the shaft portion 412, and the protruding portion 413 of the operation member 41, the pedestal 42, and the like described above are merely examples, and these components may have other shapes. For example, in the above exemplary embodiment, the pedestal 42 is formed into a ring shape of which a center portion has a hole. Alternatively, in another exemplary embodiment, the pedestal 42 may be a circular plate. Further, the protruding portion 413 of the operation member 41 may have not only the umbrella shape described above but also another shape. For example, the protruding portion 413 may be so shaped as to extend in the horizontal direction of the shaft portion 412 (a direction away from the center of the shaft portion 412) and extend bending sharply downward in the middle. Then, when the operation member 41 is tilted, the protruding portion 413 may come into contact with the pedestal 42, and the tilt of the operation member 41 may be limited by this contact.

Figure 20:
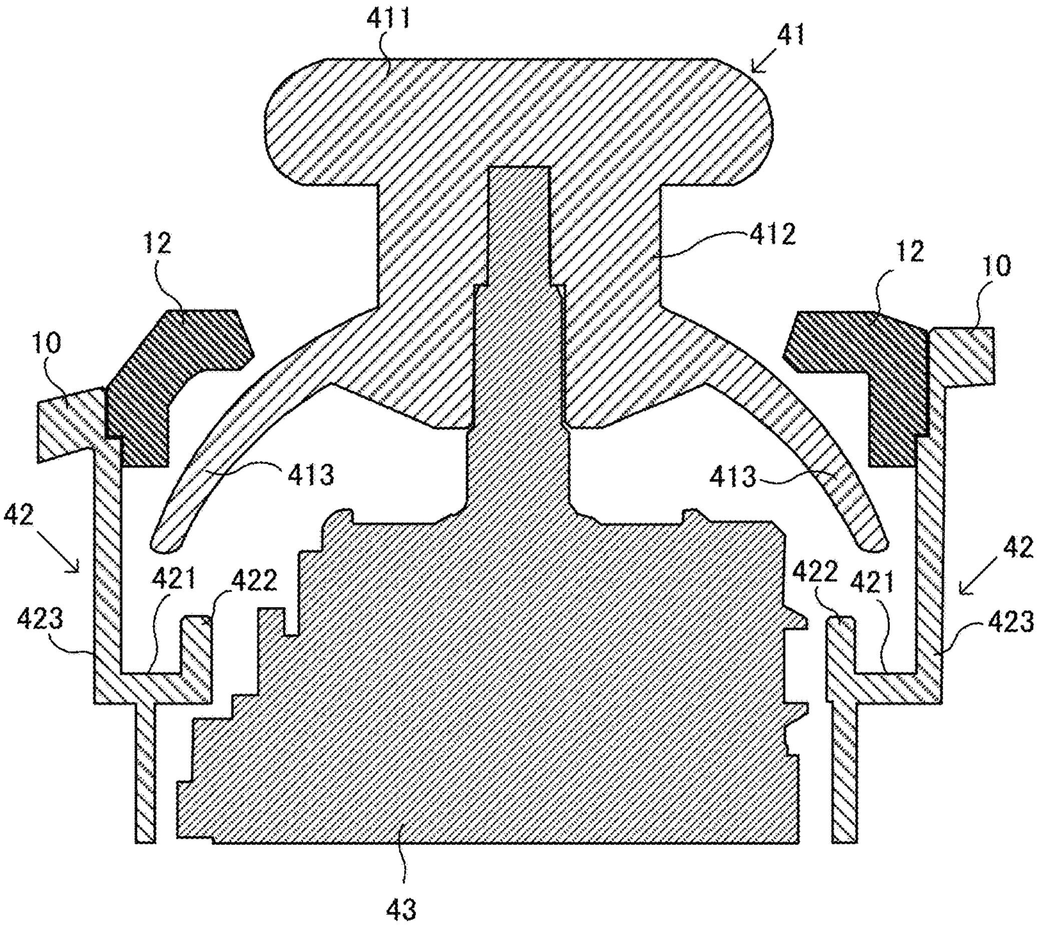
FIG. 20 is an example non-limiting diagram showing an example of the configuration of another exemplary embodiment.

Further, in the above exemplary embodiment, the pedestal 42 is formed as a member separate from the housing. In another exemplary embodiment, a pedestal may be formed as a part of the housing. FIG. 20 is a diagram showing an example of the configuration of another exemplary embodiment.

FIG. 20 conceptually shows an example of an end surface of a game controller when cut in the center of the analog stick 4 in a case where the pedestal 42 is formed as a part of the first housing 10. As shown in FIG. 20, the first housing 10 and the pedestal 42 are formed in a unified manner. That is, the first housing 10 includes the contact surface 421 that, when the operation member 41 is tilted, comes into contact with the protruding portion 413 of the operation member 41 within the first housing 10. Further, the pedestal 42 as a part of the first housing 10 includes the inner wall 422 and the outer wall 423. The tilt of the operation member 41 is limited by the pedestal 42 as a part of the first housing 10. Further, in the periphery of the opening portion 11 of the first housing 10, the ring member 12 shown in FIG. 18 may be provided.

Further, in the above exemplary embodiment, in the first housing 10, the opening portion 11 is provided, and the analog stick 4 is formed of the operation member 41 of which a part is exposed through the opening portion 11, the pedestal 42, and the analog stick main body part 43. In another exemplary embodiment, a part of the analog stick 4 may be formed as a part of the housing. That is, the analog stick 4 may be formed of a housing member exposed to outside, the operation member 41, the pedestal 42, and the analog stick main body part 43. Then, an opening may be provided in a housing of a controller main body forming the external shape of a controller, and the housing member as a part of the analog stick 4 and the operation member 41 may be exposed through this opening.

Further, in the above exemplary embodiment, the tilt of the operation member 41 is limited by the extremity of the protruding portion 413 of the operation member 41 coming into contact with the pedestal 42 provided below the protruding portion 413 (in the z-axis direction). In another exemplary embodiment, the tilt of the operation member may be limited by another portion of the protruding portion 413 coming into contact with the pedestal. For example, when the operation member is tilted, the side surface of the protruding portion of the operation member may come into contact with the pedestal, and the tilt of the operation member may be limited by this contact.

Further, in the above exemplary embodiment, using the analog stick main body part 43 that can be tilted in any direction, the tilt of the analog stick 4 is limited by the operation member 41 and the pedestal 42. In another exemplary embodiment, such limitation may be applied to a slide pad slidable in the horizontal direction (a direction parallel to the surface of the housing).

Further, the above analog stick 4 may be applied to an information processing apparatus including an input device. That is, in an information processing apparatus unified with an input device, the input device may include the analog stick 4. For example, a mobile game apparatus may include the above analog stick 4. Further, a smartphone, a tablet terminal, or a personal computer may include the above analog stick 4.

While the exemplary embodiment has been described, the above description is merely illustrative, and the exemplary embodiment may be improved and modified in various manners.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An input device comprising:

a housing including an opening;

an operation member including:

- a keytop configured to be operated by a user;
- a shaft extending from the keytop and through the opening, the shaft having a first clearance from a periphery of the opening; and
- a protruding portion protruding from the shaft and having an edge region distal from the shaft; and a contact portion fixed within the housing, wherein:

- the shaft is configured to be tilted,
- the protruding portion is configured such that as the shaft is tilted in a tilt direction and the first clearance decreases, tilt of the shaft in the tilt direction is limited when a first part of the edge region of the protruding portion in the tilt direction contacts the contact portion,
- the protruding portion is configured such that as the shaft is tilted in the tilt direction and the first clearance decreases, a second part of the edge region of the protruding portion that is opposite the tilt direction does not contact the contact portion, and the protruding portion is constructed from a first material, the contact portion further comprises a substrate constructed from a second material and a third material positioned on the substrate, and a coefficient of friction between the first material and the third material being lower than a coefficient of friction between the first material and the second material.

2. The input device of claim 1, wherein the third material is formed as a sheet.

3. The input device of claim 2, where the sheet is a nylon sheet or a fluorine sheet.

4. The input device of claim 1, wherein the third material is a foamed resin.

5. The input device of claim 4, wherein the foamed resin is foamed polyurethane or foamed polyethylene.

6. The input device of claim 1, wherein the third material has a lower modulus of elasticity than the second material.

7. The input device of claim 6, wherein the third material has a lower modulus of elasticity than the first material.

8. The input device of claim 1, wherein the second material and the third material are different materials.

9. The input device of claim 1, wherein the protruding portion is configured such that when the first part of the edge region of the protruding portion contacts the third material, the first clearance between the shaft in the tilt direction and the periphery of the opening remains.

10. The input device of claim 9, wherein the operation member is configured to be tilted about a tilt point in the housing, and wherein a longitudinal axis of the shaft passes through the tilt point.

11. The input device of claim 1, wherein the contact portion is a part of an inner surface of the housing or a part of a pedestal positioned within the housing.

12. The input device of claim 11, wherein the contact portion is a part of the pedestal, and when the first part of the edge region of the protruding portion contacts the part of the pedestal to limit tilt in the tilt direction, the second part of the edge region of the protruding portion does not contact the pedestal and does not contact the housing.

13. The input device of claim 12, wherein the contact portion has a ring shape.

14. The input device of claim 13, further comprising, on an inner circumferential side of the contact portion, an inner wall extending in an outward direction of the housing.

15. The input device of claim 14, wherein the protruding portion is configured such that as the shaft is tilted, there is a second clearance between the inner wall and the protruding portion.

16. The input device of claim 15, wherein the operation member is configured to be tilted about a tilt point in the housing, and wherein a longitudinal axis of the shaft passes through the tilt point.

17. The input device of claim 1, wherein the shaft comprises a first end and a second end opposite the first end, the keytop being positioned at the first end, and the protruding portion protruding from the shaft between the first end and the second end.

18. The input device of claim 1, wherein the protruding portion protrudes from the shaft along a curved path.

19. An input device comprising:

a housing including an opening;

an operation member including:

a keytop configured to be operated by a user;

a shaft extending from the keytop and through the opening, the shaft having a first clearance from a periphery of the opening; and a protruding portion protruding from the shaft and having an edge region distal from the shaft, and the protruding portion being constructed from a first material; and a contact portion fixed within the housing, and the contact portion further comprising a substrate constructed from a second material and a third material positioned on the substrate, wherein:

the shaft is configured to be tilted, the protruding portion is configured such that as the shaft is tilted in a tilt direction and the first clearance decreases, tilt of the shaft in the tilt direction is limited by the third material of the contact portion when a first part of the edge region of the protruding portion in the tilt direction is in contact with the third material of the contact portion, the protruding portion is configured such that as the shaft is tilted in the tilt direction and the first clearance decreases, a second part of the edge region of the protruding portion that is opposite the tilt direction does not contact the contact portion, and a coefficient of friction between the first material and the third material being lower than a coefficient of friction between the first material and the second material.

* * * * *